(12) United States Patent
Yamaji

(10) Patent No.: US 8,805,119 B2
(45) Date of Patent: Aug. 12, 2014

(54) IMAGE RENDERING DEVICE, IMAGE RENDERING METHOD, AND RECORDING MEDIUM

(75) Inventor: Junko Yamaji, Osaka (JP)

(73) Assignee: NEC System Technologies, Ltd., Osaka ( * ) Notice: Subject to any disclaimer, the term of this patent is extended or adjusted under 35 U.S.C. 154(b) by 258 days.

(21) Appl. No.: 13/510,190

(22) PCT Filed: Nov. 17, 2010

(86) PCT No.: PCT/JP2010/070512
§ 371 (c)(1),
(2), (4) Date: May 16, 2012

(87) PCT Pub. No.: WO2011/062205
PCT Pub. Date: May 26, 2011

(65) Prior Publication Data
US 2012/0230607 A1      Sep. 13, 2012

(30) Foreign Application Priority Data

Nov. 17, 2009   (JP) ................................. 2009-262099

(51) Int. Cl.
*G06K 9/32*     (2006.01)
(52) U.S. Cl.
USPC ............ 382/296; 382/298; 345/660; 345/689
(58) Field of Classification Search
CPC ............ G06K 9/32; G06K 9/42; G06T 3/606; G06T 3/60; G06T 3/40; G06T 3/608; G06T 3/4092; H04N 1/393; H04N 1/3877
USPC ............................ 382/296, 298; 345/660, 689
See application file for complete search history.

(56) References Cited

U.S. PATENT DOCUMENTS 5,359,677 A * 10/1994 Katsurada et al. ............ 382/290
5,428,725 A *  6/1995 Sugai et al. ................... 345/648

(Continued)

FOREIGN PATENT DOCUMENTS

| JP | 2-028891 A | 1/1990 |
|---|---|---|
| JP | 3-15989 A | 1/1991 |
| JP | 11-252353 A | 9/1999 |
| JP | 11-306343 A | 11/1999 |
| JP | 2000-515652 A | 11/2000 |
| JP | 2005-228073 A | 8/2005 |
| JP | 2007-026285 A | 2/2007 |
| JP | 2008-006803 A | 1/2008 |
| JP | 2008-236085 A | 10/2008 |

*Primary Examiner* — Stephen R Koziol
*Assistant Examiner* — Shaghayegh Azima
(74) *Attorney, Agent, or Firm* — Sughrue Mion, PLLC

(57) ABSTRACT

A rendering command generator (11) acquires coordinate transformation information and a rendering region that converts and displays a reference image in a display image, and sets a coordinate transformation matrix in a register (21). A rendering block setting unit (22) sets the number of vertical and horizontal pixels of a rectangular region that divides and covers the rendering region in such a way that the region in which the rectangular region is subjected to coordinate transformation from a rendering region to a reference image by a coordinate transformation matrix conforms with the shape on the image of the image cache (15) from which the reference image is read out. A pixel generator (13) scans the rendering region by using the set rectangular region and generates pixel positions, and a coordinate transformation unit (14) reads out from external memory (20) image data on the pixel positions of the reference image corresponding to the pixels of the rendering region. The image cache (15) stores the image data read out from the external memory (20). A rendering processor (16) reads out image data from the image cache (15) and converts the image data to pixels of the rendering region.

12 Claims, 22 Drawing Sheets

(56) References Cited

U.S. PATENT DOCUMENTS

| | | | |
|---|---|---|---|
| 5,594,650 A * | 1/1997 | Shah et al. | 701/454 |
| 5,742,924 A * | 4/1998 | Nakayama | 701/458 |
| 6,317,523 B1 * | 11/2001 | Miura et al. | 382/298 |
| 6,470,098 B2 * | 10/2002 | Yamaguchi et al. | 382/284 |
| 8,115,764 B2 * | 2/2012 | Kameda et al. | 345/420 |
| 8,350,929 B2 * | 1/2013 | Tsurumi | 348/239 |
| 2003/0058260 A1 * | 3/2003 | Ohshima et al. | 345/666 |
| 2007/0279420 A1 * | 12/2007 | Ichikawa | 345/501 |
| 2008/0012850 A1 * | 1/2008 | Keating, III | 345/419 |

* cited by examiner

FIG.2

$$\begin{pmatrix} X' \\ Y' \\ 1 \end{pmatrix} = \begin{pmatrix} a & b & tx \\ c & d & ty \\ 0 & 0 & 1 \end{pmatrix} \begin{pmatrix} X \\ Y \\ 1 \end{pmatrix}$$

FIG.4D
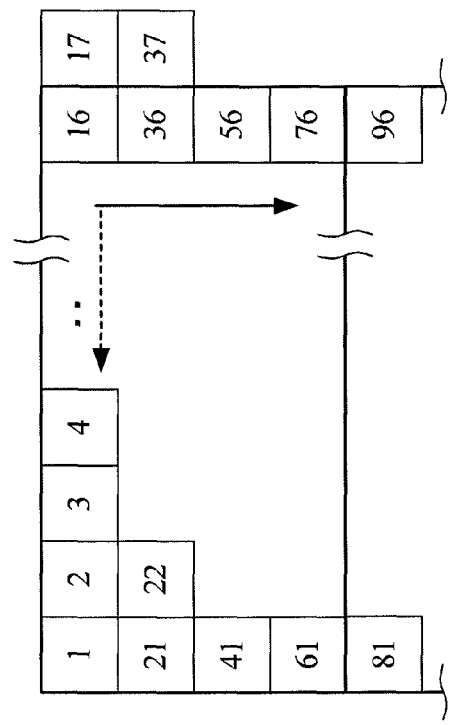
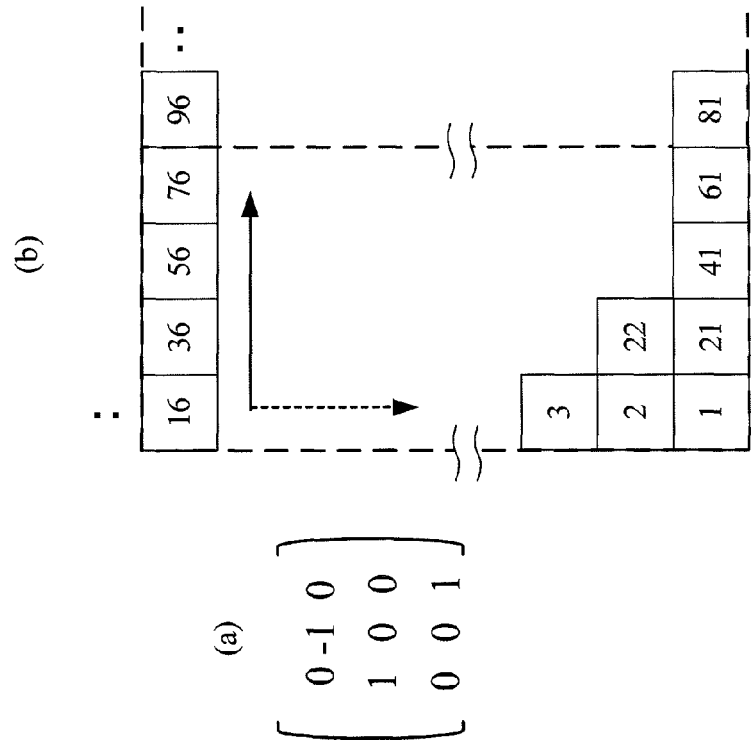

IMAGE RENDERING DEVICE, IMAGE RENDERING METHOD, AND RECORDING MEDIUM

CROSS REFERENCE TO RELATED APPLICATIONS

This application is a National Stage of International Application No. PCT/JP2010/070512 filed on Nov. 17, 2010, which claims priority from Japanese Patent Application No. 2009-262099, filed on Nov. 17, 2009, the contents of all of which are incorporated herein by reference in their entirety.

TECHNICAL FIELD

The present invention relates to an image rendering device, and more particularly to an image rendering device, an image rendering method and a recording medium for converting reference images and displaying such in a rendering region on a display image.

BACKGROUND ART

In computer graphics, a reference image that is an original is often converted such as through rotation and/or the like and displayed overlapping a display image. In such a transformation process, high-speed processing is necessary. Hence, various technologies have been suggested for converting reference images at high speed.

For example, in Patent Literature 1, an image processing device is disclosed in which image data input in line-base format is temporarily stored in a buffer memory with smaller capacity than the image data capacity of one image and is output in block interleave format.

In Patent Literature 2, an image processing device is disclosed that renders an image at high speed by expanding one line of source image data.

In Patent Literature 3, an imaging device is disclosed for rotating image data at high speed.

In Patent Literature 4, an image interpolation method is disclosed in which a reference image undergoes coordinate transformation and the resulting image is interpolated.

In addition, in Patent Literature 5, a two-dimensional data rotating and processing device is disclosed that can accomplish rotation processing of an image at high speed.

PRIOR ART LITERATURE

Patent Literature

Patent Literature 1: Unexamined Japanese Patent Application Kokai Publication No. 2005-228073
Patent Literature 2: Unexamined Japanese Patent Application Kokai Publication No. 2007-026285
Patent Literature 3: Unexamined Japanese Patent Application Kokai Publication No. 2008-236085
Patent Literature 4: Unexamined Japanese Patent Application Kokai Publication No. H11-252353
Patent Literature 5: Unexamined Japanese Patent Application Kokai Publication No. H11-306343

DISCLOSURE OF INVENTION

Problems Overcome by the Invention

In a rendering image procedure for displaying a reference image after accomplishing coordinate transformation on such, data transformation takes time when acquiring reference image data items one by one from memory. Hence, rendering technology is known in which high-speed rendering is accomplished by pre-fetching a reference image into a cache memory and accomplishing a process such as altering the cache size so that the address thereof can be continuously accessed.

With this rendering technology, the scanning direction of the reference image stored in the cache memory is fixed in the direction from the top left to the bottom right of the display screen. Consequently, when enlarging, reducing and/or rotating the image, the hit ratio of the cache decreases, the memory access volume increases and it becomes impossible to render the image at high speed.

In consideration of the foregoing, it is an object of the present invention to provide an image rendering device, an image rendering method and a recording medium in which declines in the cache hit ratio caused by coordinate transformation are small.

Problem Resolution Means

The image rendering device according to a first aspect of the present invention has:

a rendering region acquisition unit for acquiring information for specifying a rendering region, which is a region in which a reference image is converted and displayed, in a display image;

a coordinate transformation information acquisition unit for acquiring information designating coordinate transformation from coordinates of the rendering region to coordinates of the reference image, for converting and displaying the reference image in the rendering region;

a setting unit for setting vertical and horizontal pixel numbers in a rectangular region covering the rendering region such that a prescribed relationship is satisfied by a first region obtained by having the rectangular region undergo the coordinate transformation, and a second region positioned on the reference image and in response to image data recorded in an image cache that stores the reference image;

a generation unit for generating one or more of the rectangular regions covering the rendering region with the vertical and horizontal pixel numbers set by the setting unit;

a transformation unit for selecting the rectangular regions in order in a prescribed scanning direction, and computing pixel position within the reference image through the coordinate transformation from pixels selected in order in the scanning direction in the selected rectangular regions;

an image acquisition unit for reading image data in the pixel position computed by the transformation unit from memory storing the reference image;

the image cache for storing image data read from the memory; and a rendering unit for reading image data from the image cache and converting such into pixels in the rendering region.

The image rendering device according to a second aspect of the present invention has:

a rendering region acquisition unit for acquiring information for specifying a rendering region, which is a region in which a reference image is converted and displayed, in a display image;

a coordinate transformation information acquisition unit for acquiring information designating coordinate transformation from coordinates of the rendering region to coordinates of the reference image, for converting and displaying the reference image in the rendering region;

a setting unit for rectangular regions covering the rendering region;

a generation unit for generating one or more of the rectangular regions covering the rendering region with the rectangular regions set by the setting unit;

a transformation unit for selecting the rectangular regions in order in a prescribed scanning direction, and computing pixel position within the reference image through the coordinate transformation from pixels selected in order in the scanning direction in the selected rectangular regions;

an image acquisition unit for reading image data in the pixel position computed by the transformation unit from memory storing the reference image;

the image cache for storing image data read from the memory; and a rendering unit for reading image data from the image cache and converting such into pixels in the rendering region;

wherein when the smaller angle formed by the direction of the horizontal direction of the rendering region after coordinate transformation and the horizontal direction of a region corresponding to image data recorded in an image cache in which the reference image is stored and positioned on the reference image exceeds 45 degrees, the transformation unit switches the primary scanning direction and the auxiliary scanning direction of the primary scanning direction, selects in order rectangular regions covering the rendering region and scans the selected rectangular region to select pixels.

The image rendering method according to a third aspect of the present invention:

acquires information for specifying a rendering region, which is a region in which a reference image is converted and displayed, in a display image;

acquires information designating coordinate transformation from coordinates of the rendering region to coordinates of the reference image, for converting and displaying the reference image in the rendering region;

sets the size of rectangular regions such that a prescribed relationship is satisfied by a first region obtained by having the rectangular regions undergo the coordinate transformation, and a second region positioned on the reference image and in response to image data recorded in an image cache that stores the reference image;

generates one or more rectangular regions covering the rendering region with the vertical and horizontal pixel numbers set by the set size selects the rectangular regions in order in a prescribed scanning direction, and computes pixel position within the reference image through the coordinate transformation from pixels selected in order in the scanning direction in the selected rectangular regions;

reads image data in the computed pixel position from memory storing the reference image;

stores image data read from the memory; and reads image data from the image cache and converts such into pixels in the rendering region.

The image rendering method according to a fourth aspect of the present invention:

acquires information for specifying a rendering region, which is a region in which a reference image is converted and displayed, in a display image;

acquires information designating coordinate transformation from coordinates of the rendering region to coordinates of the reference image, for converting and displaying the reference image in the rendering region;

sets rectangular regions for covering the rendering region;

generates one or more of the rectangular regions covering the rendering region with the set rectangular regions;

selects the rectangular regions in order in a prescribed scanning direction, and computes pixel position within the reference image through the coordinate transformation from pixels selected in order in the scanning direction in the selected rectangular regions;

reads image data in the pixel position computed by the coordinate transformation from memory storing the reference image;

stories image data read from the memory;

reads image data from the image cache and converts such into pixels in the rendering region; and when the smaller angle formed by the direction of the horizontal direction of the rendering region after coordinate transformation and the horizontal direction of a region corresponding to image data recorded in an image cache in which the reference image is stored and positioned on the reference image exceeds 45 degrees, switches the primary scanning direction and the auxiliary scanning direction of the primary scanning direction, selects in order rectangular regions covering the rendering region and scans the selected rectangular region to select pixels.

The computer-readable recording medium according to a fifth aspect of the present invention causes a computer to execute:

a process for acquiring information for specifying a rendering region, which is a region in which a reference image is converted and displayed, in a display image;

a process for acquiring information designating coordinate transformation from coordinates of the rendering region to coordinates of the reference image, for converting and displaying the reference image in the rendering region;

a process for setting the size of rectangular regions such that a prescribed relationship is satisfied by a first region obtained by having the rectangular regions undergo the coordinate transformation, and a second region positioned on the reference image and in response to image data recorded in an image cache that stores the reference image;

a process for generating one or more of the rectangular regions covering the rendering region with a set size;

a process for selecting the rectangular regions in order in a prescribed scanning direction, and computing pixel position within the reference image through the coordinate transformation from pixels selected in order in the scanning direction in the selected rectangular regions;

a process for reading image data in the computed pixel position from memory storing the reference image;

a process for storing image data read from the memory; and a process for reading image data from the image cache and converting such into pixels in the rendering region.

The computer-readable recording medium according to a sixth aspect of the present invention causes a computer to execute:

a process for acquiring information for specifying a rendering region, which is a region in which a reference image is converted and displayed, in a display image;

a process for acquiring information designating coordinate transformation from coordinates of the rendering region to coordinates of the reference image, for converting and displaying the reference image in the rendering region;

a process for setting rectangular regions for covering the rendering region;

a process for generating one or more of the rectangular regions covering the rendering region with the set rectangular regions;

a process for selecting the rectangular regions in order in a prescribed scanning direction, and computing pixel position within the reference image through the coordinate transformation from pixels selected in order in the scanning direction in the selected rectangular regions;

a process for reading image data in the computed pixel position from memory storing the reference image;

a process for storing image data read from the memory;

a process for reading image data from the image cache and converting such into pixels in the rendering region; and a process for, when the smaller angle formed by the direction of the horizontal direction of the rendering region after coordinate transformation and the horizontal direction of a region corresponding to image data recorded in an image cache in which the reference image is stored and positioned on the reference image exceeds 45 degrees, switching the primary scanning direction and the auxiliary scanning direction of the primary scanning direction, selecting in order rectangular regions covering the rendering region and scanning the selected rectangular region to select pixels.

Efficacy of the Invention

With the present invention, it becomes possible to efficiently use cache. As a result, image rendering can be accomplished at high speed when converting and displaying a reference image, by reducing declines in the cache hit ratio.

BRIEF DESCRIPTION OF DRAWINGS

FIG. 2 is a drawing explaining coordinate transformation;

FIG. 4D is a drawing explaining image cache access according to a first preferred embodiment when the rendering block is changed in conjunction with rotation of the reference image;

BEST MODE FOR CARRYING OUT THE INVENTION

Figure 1:
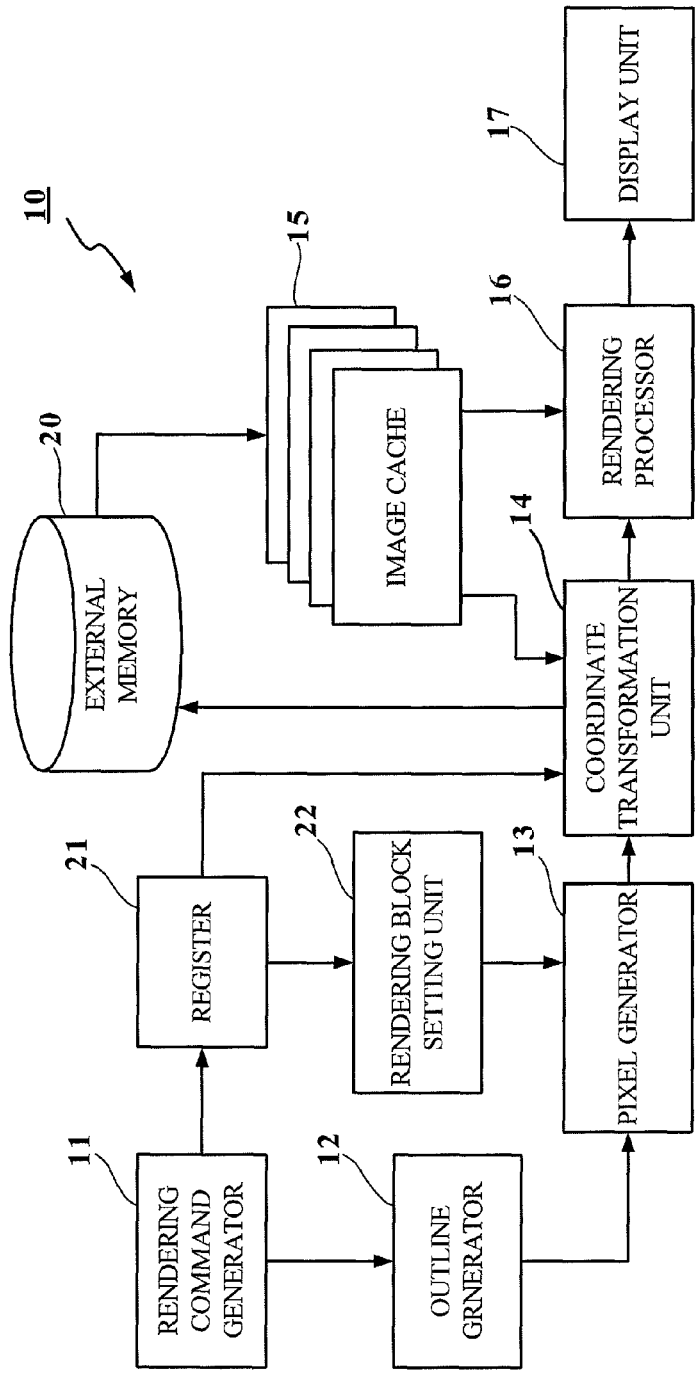
FIG. 1 is a block diagram showing an exemplary composition of an image rendering device according to a preferred embodiment of the present invention.

The best mode for carrying out the invention is explained below with reference to the drawings. Same or corresponding parts in the drawings are labeled with the same reference numbers.

(First Preferred Embodiment)

An image rendering device 10 according to a first preferred embodiment functionally has a rendering command generator 11, an outline generator 12, a pixel generator 13, a coordinate transformation unit 14, an image cache 15, a rendering processor 16, a display unit 17, an external memory 20, a register 21 and a rendering block setting unit 22, as shown in FIG. 1.

The image rendering device 10 is composed from a hardware perspective of a microcomputer, an FPGA (Field Programmable Gate Array), a DSP (Digital Signal Processor) and/or an LSI provided with special logic circuits, along with a display device, an external memory and/or the like.

The rendering command generator 11 receives a reference image displayed overlapping an image (display image) on a display, and rendering region specifying information specifying the rendering region, which is a region in which the reference image is converted and displayed, and from the information specifying the reference image and the rendering region generates a coordinate transformation matrix for converting coordinates from the rendering region to the reference image. The rendering command generator 11 sets the generated coordinate transformation matrix in the register 21. Following this, the rendering command generator 11 issues a rendering command directing the start of rendering to the various components in the image rendering device 10.

The outline generator 12, in response to the rendering command, receives rendering region specifying information from the rendering command generator 11 and generates outline coordinates (coordinate data defining an outline) defining the outline of the rendering region on the display image. The outline generator 12 sends the outline coordinates to the pixel generator 13.

The register 21 stores the coordinate transformation matrix created by the rendering command generator 11. As necessary, the register 21 sends the coordinate transformation matrix to the rendering block setting unit 22 and the coordinate transformation unit 14.

Prior to the start of rendering processing, the rendering block setting unit 22 sets the number of horizontal and vertical pixels in the rendering block using the coordinate transformation matrix set in the register 21 and a below-described cache block size. The rendering block is a rectangular region covering the rendering region. The rendering block covering the rendering region basically means the union of the rendering block pixels includes all pixels of the rendering region. As an exception, when there are invalid pixels in the reference image, there may be pixels of the rendering region that are not included in the rendering block. In general, rendering blocks cover (partition) the rendering region without pixels overlapping. Vertical and horizontal for the rendering block are along the direction of scanning the display image. Setting the size of a rendering block is described in detail below.

The pixel generator 13 receives the outline coordinates supplied from the outline generator 12 and the block information specifying the rendering block set by the rendering block setting unit 22, finds the coordinates of the pixels in the outline in accordance with the outline coordinates and block information, and sends the generated output coordinate data to the coordinate transformation unit 14 one pixel at a time. The process of finding the coordinates (X,Y) of each pixel inside the outline is called the pixel generation process.

The coordinate transformation unit 14 multiplies the coordinates generated by the pixel generator 13 by the coordinate transformation matrix and computes the corresponding coordinates on the reference image. In addition, the coordinate transformation unit 14 reads image data for the computed coordinates from the external memory 20. Specifically, the coordinate transformation unit 14 checks whether or not the image data for the computed coordinates is stored in the image cache 15, and if such is stored, reads image data from the image cache 15, and if such is not stored, issues an image read-out request to the external memory 20 and accepts of image data from the image cache 15. In addition, the coordinate transformation unit 14 issues cache information consisting of the cache number where the read-out image data is stored and the address within that cache to the rendering processor 16.

The external memory 20 stores the image data of the reference image. Points on the reference image are defined by the coordinate system of the reference image. The external memory 20 supplies image data to the image cache 15 in accordance with commands from the coordinate transformation unit 14.

The image cache 15 is composed of one or multiple cache blocks. A cache block stores image data of a rectangular region composed of pixels the vertical and horizontal numbers of which are fixed. The image cache 15 reads out and stores image data in block units from the external memory 20.

The rendering processor 16 reads the image data from the image cache 15 and generates a arrangement of pixels to be displayed. The rendering processor 16 checks the image cache 15 and stores image data necessary for rendering in the image cache 15. Following this, the rendering processor 16 reads the reference image data and accomplishes the rendering process on the reference image data that was read. The rendering processor 16 issues a display start command to the display unit 17.

The display unit 17 displays on a screen the arrangement of pixels generated by the rendering processor 16.

Next, an example of typical coordinate transformation accomplished by the coordinate transformation unit 14 in the first preferred embodiment is described with reference to FIG. 2. FIG. 2 shows an affine transformation. An affine transformation is expressed by a single coordinate transformation matrix that combines enlarging/reducing an image with rotation and translation. By multiplying the pre-transformation coordinates (X,Y) by the coordinate transformation matrix, post-transformation coordinates (X',Y') are obtained (FIG. 2). Entries a, b, c and d in the coordinate transformation matrix shown in FIG. 2 are elements for enlarging/reducing and/or rotating the coordinates. Entries tx and ty are elements for translating the coordinates. When this equation is applied to coordinate transformation by the coordinate transformation unit 14, the coordinates (X,Y) are the output coordinates (the coordinates on the display image). On the other hand, the coordinates (X',Y') are the coordinates of the reference image.

The pixel generator 13 in FIG. 1 covers the rendering region with rendering blocks having the vertical and horizontal pixel numbers of rendering blocks set by the rendering block setting unit 22, and covers the rendering region. The pixel generator 13 selects the rendering blocks in accordance with scanning Following this, the pixel generator 13 scans the pixels in the selected rendering blocks and finds the output coordinates in the display image.

Next, the process executed by the coordinate transformation unit 14 and the rendering processor 16 for reading the reference image from the image cache 15, performing image transformation and developing such on the rendering blocks set by the rendering block setting unit 22 will be described To facilitate understanding, first the relationship between the rendering blocks set by the rendering block setting unit 22, the cache block storing the reference image in the image cache 15 and the image transformation will be explained by contrasting the conventional art and this preferred embodiment, with reference to FIGS. 3A to 4D.

FIGS. 3A to 3D explain a conventional method in which the rendering blocks are fixed, and FIGS. 4A to 4D explain a method according to this preferred embodiment in which the size of the rendering blocks is appropriately adjusted.

In FIGS. 3A to 4D below, part (a) expresses a coordinate transformation matrix. None of the coordinate transformation matrices accomplish a translation in coordinate transformation. In addition, part (b) shows a rendering block and part (c) shows a cache block in the image cache 15.

In FIGS. 3A to 4D, the cache block is fixed by a rectangle 16 pixels across and 4 pixels down, as indicated by the bold lines in part (c). On the other hand, the rendering blocks of the conventional method shown in part (b) in FIGS. 3A to 3D are fixed by a square 16 pixels across and 16 pixels down as indicated by the dotted lines. On the other hand, the rendering blocks shown in part (b) in FIGS. 4A to 4D have an appropriate size that changes as indicated by the dotted lines.

The small squares in parts (b) and (c) of FIGS. 3A to 4D represent a single pixel. The number in the pixel indicates correspondence to pixels that undergo image display from the cache block to the rendering block. For example, the pixel "1" in the cache block is displayed at the position of the pixel with the same number "1" in the rendering block. The numbers in the pixels do not indicate the scanning sequence in the rendering block. The primary scanning direction in the rendering blocks is indicated by the direction of the solid arrows. On the other hand, the auxiliary scanning direction is indicated by the dotted arrows.

Suppose the reference image is of a size with 20 pixels in the horizontal direction.

The case where the magnification ratio is 1 and the angle of rotation is 0 degrees will be described with reference to FIG. 3A.

When the magnification ratio is 1 and the angle of rotation is 0, when primary scanning of the rendering block (b) is accomplished on one row (pixels 1-16), data of one row of one cache block (pixels 1-16) is read without excess or deficiency. As primary scanning and auxiliary scanning are accomplished, in order to complete scanning of pixels contained in one rendering block, four cache blocks are necessary.

Figure 3A:
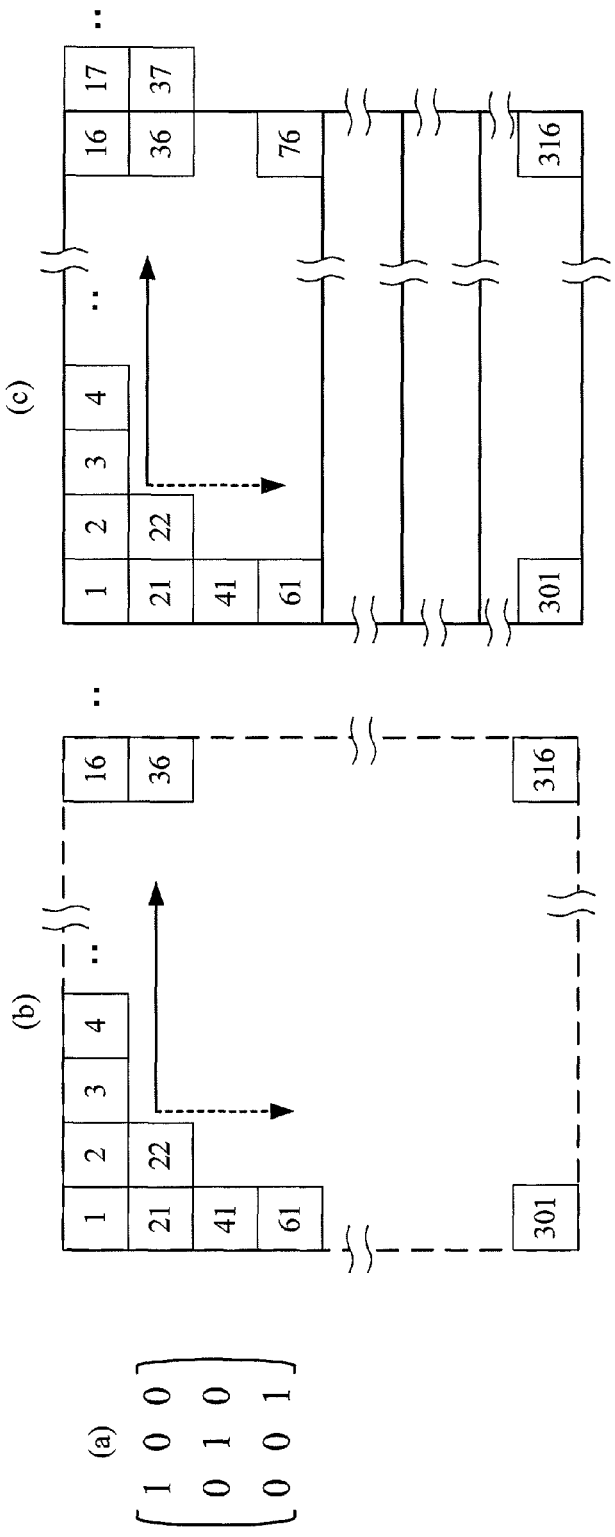
FIG. 3A is a drawing explaining image cache access and the rendering block when the magnification ratio is 1 and the angle of rotation is 0 degrees.
Figure 3B:
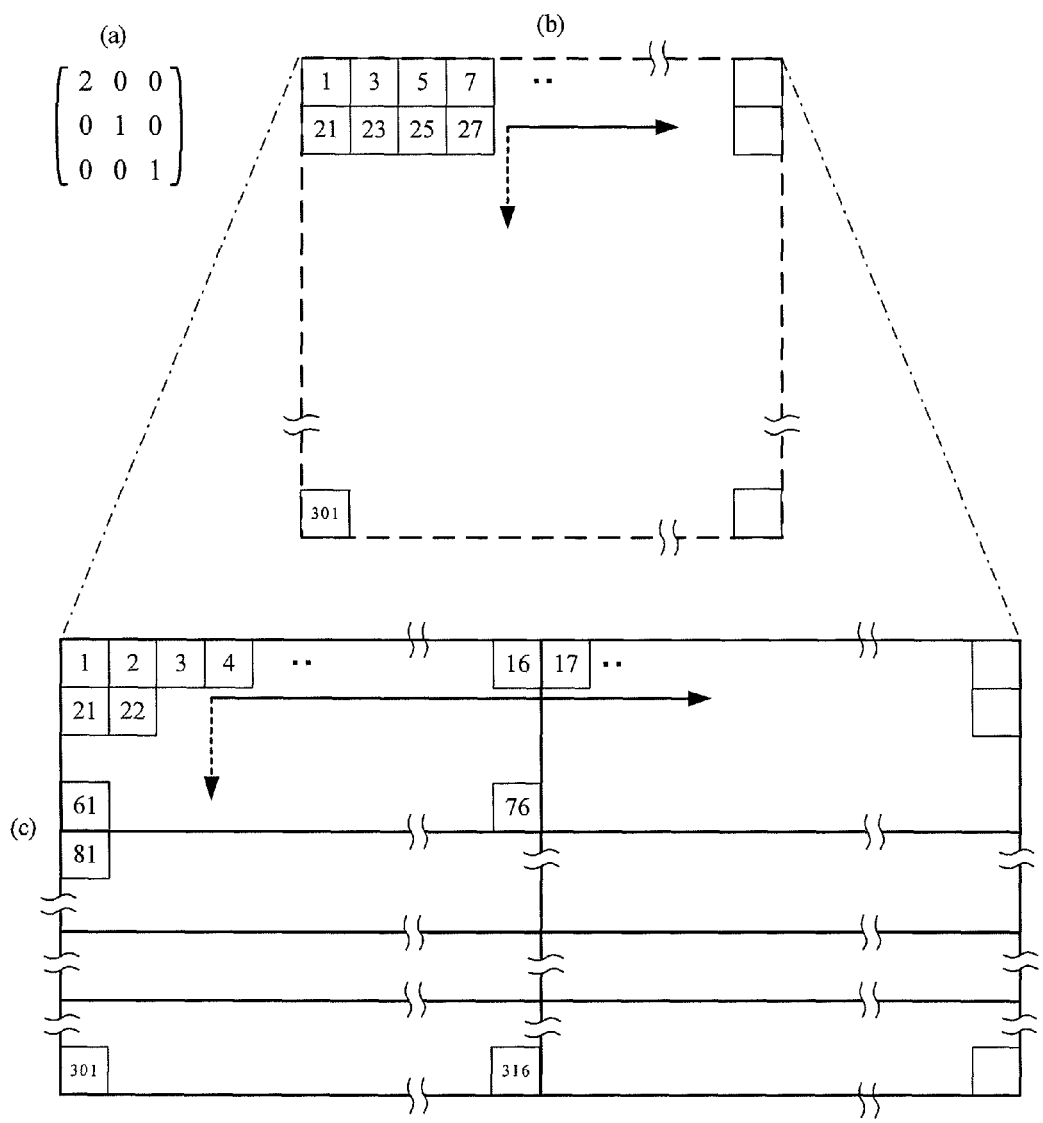
FIG. 3B is a drawing explaining image cache access when the reference image is reduced without changing the rendering block.

FIG. 3B shows the case when the magnification ratio in the X direction of the coordinate transformation is 2.0. In other words, the size in the X direction of the image stored in the rendering block is doubled, and the reference image is displayed reduced by ½ in the horizontal direction. Accordingly, in the rendering process, only every other of the 16 pixels in the X direction in one cache block can be used. For example, because the rendering block is 16 pixels across, each time one line is scanned in the X direction in the rendering block, two are used in the X direction in the cache block. In order to complete scanning for pixels contained in one rendering block, eight cache blocks are necessary. Thus, when the transformation matrix of FIG. 3B part (a) is used, cache usage efficiency drops compared to when the transformation matrix of FIG. 3A part (a) is used.

Figure 3C:
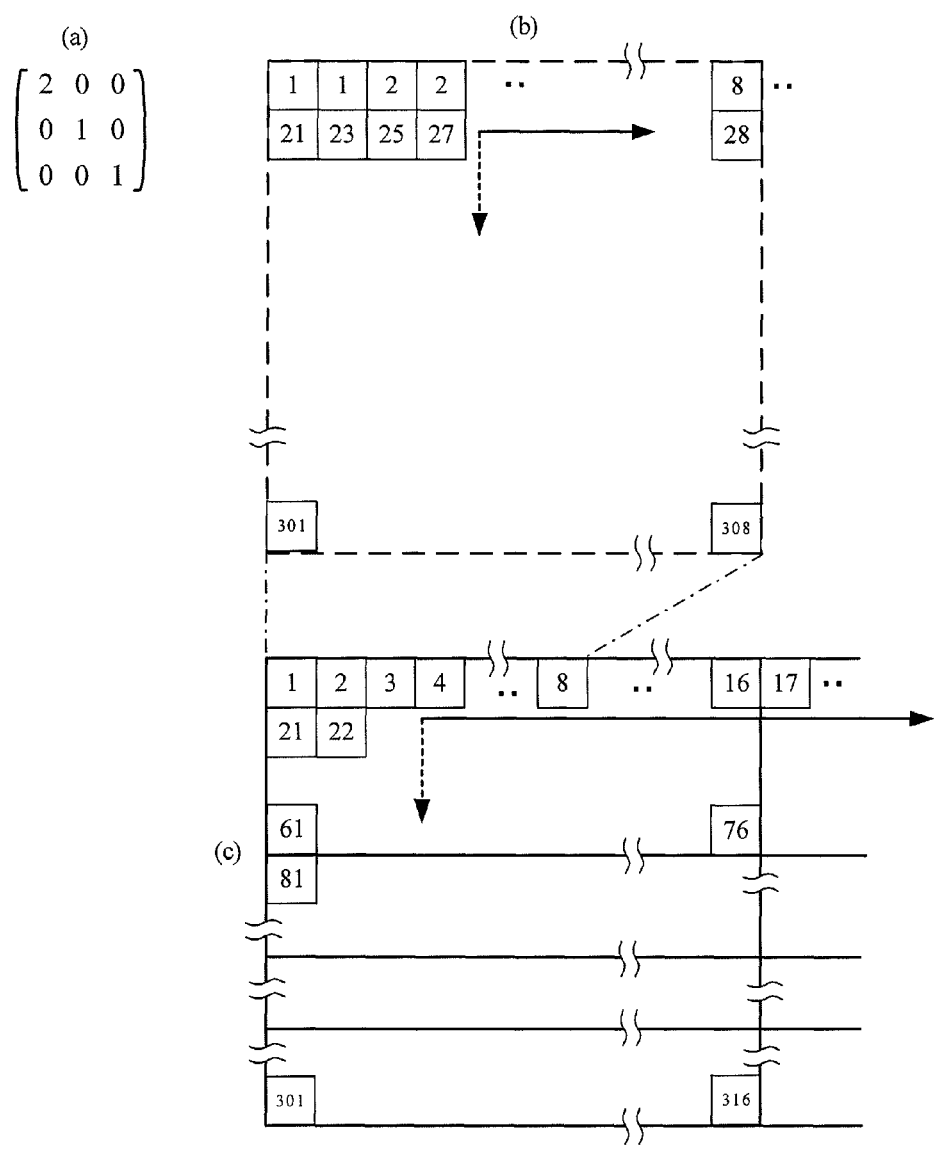
FIG. 3C is a drawing explaining image cache access when the reference image is enlarged without changing the rendering block.

FIG. 3C shows the case where the magnification ratio in the X direction of coordinate transformation is 0.5. In other words, the size in the X direction of the image stored in the rendering block is halved, and the reference image is displayed enlarged to double in the horizontal direction. Of the 16 pixels in the X direction in one cache block, only pixel numbers 1-8 are used. Because the rendering block is 16 pixels across, the remaining half of the pixels are not used. Following this, when the pixel generation process transitions to the rendering block to the right of the rendering block currently being scanned, pixel numbers 9-16 are used. However, in this case there is a possibility that the necessary data has already been discarded from the image cache 15. In this case, it is again necessary to read the same region into the image cache 15 from the external memory 20. Thus, by enlarging, there is a possibility that memory access volume increases.

Figure 3D:
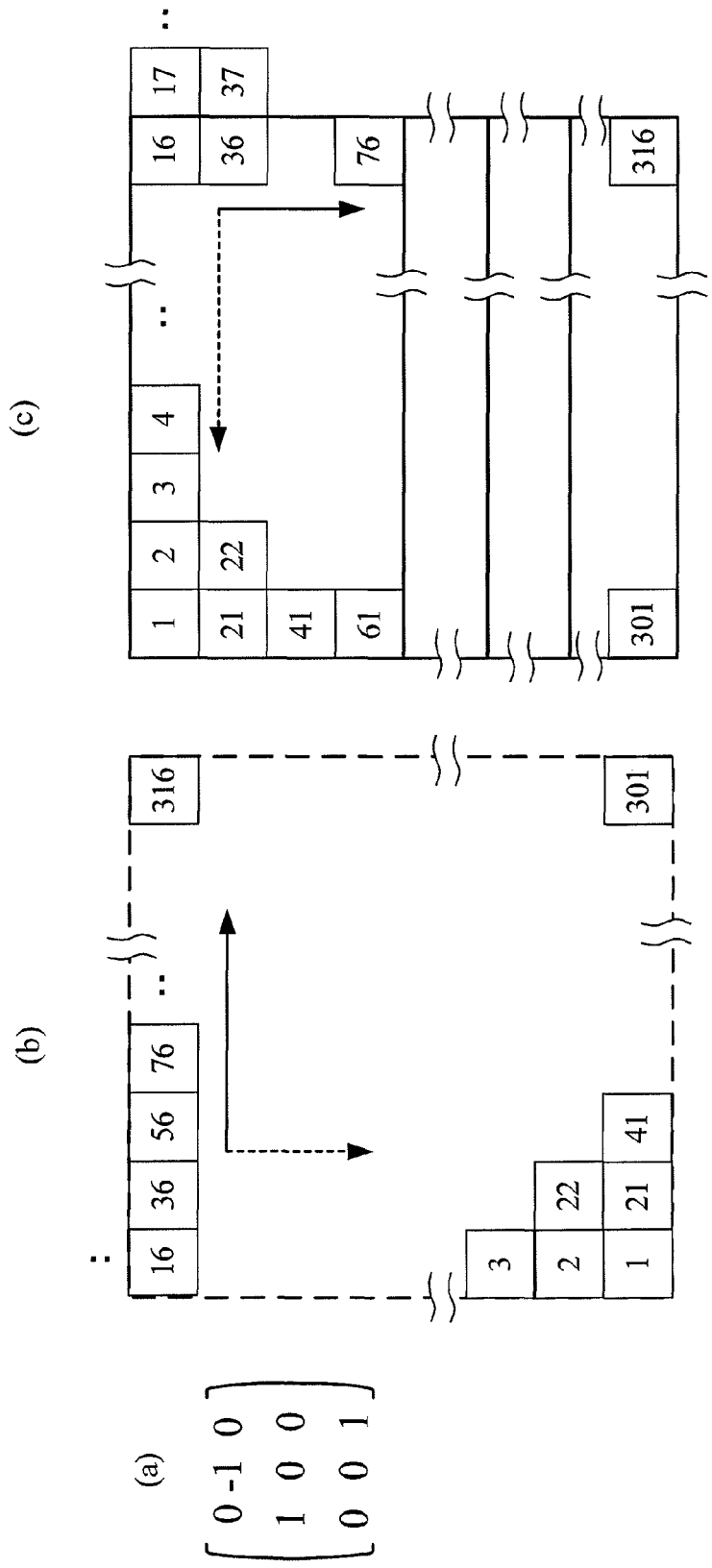
FIG. 3D is a drawing explaining image cache access when the reference image is rotated without changing the rendering block.

FIG. 3D shows the case when the reference image is rotated 90 degrees in a counterclockwise direction. When the pixels in the rendering block are scanned in the horizontal direction (the solid arrow in part (b)), scanning is accomplished in the vertical direction (the solid arrow in part (c)) in the image cache 15. In this first preferred embodiment, the cache block is four times as long in the horizontal direction as in the vertical direction. Consequently, each time one line in the horizontal direction in the rendering block is scanned, four cache blocks are used in the vertical direction. Consequently, cache efficiency declines due to rotation processing, and memory access increases.

Figure 4A:
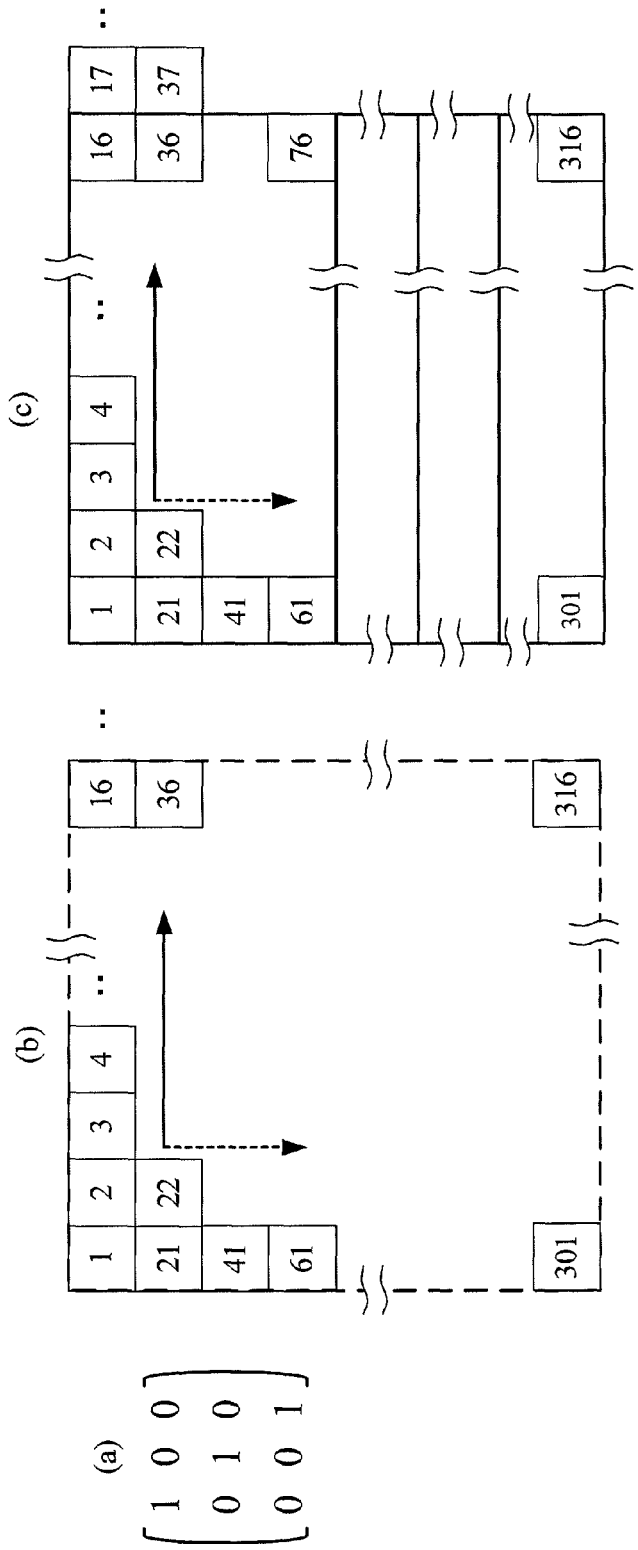
FIG. 4A is a drawing explaining image cache access and the rendering block when the magnification ratio is 1 and the angle of rotation is 0 degrees, according to a first preferred embodiment.

FIGS. 4A to 4D show examples when the size of the rendering blocks and the scanning direction are changed in the method of this preferred embodiment in contrast to FIGS. 3A to 3D, which explain a conventional method. FIG. 4A explains image cache access when image transformation is not performed.

FIG. 4A is the same as FIG. 3A.

Figure 4B:
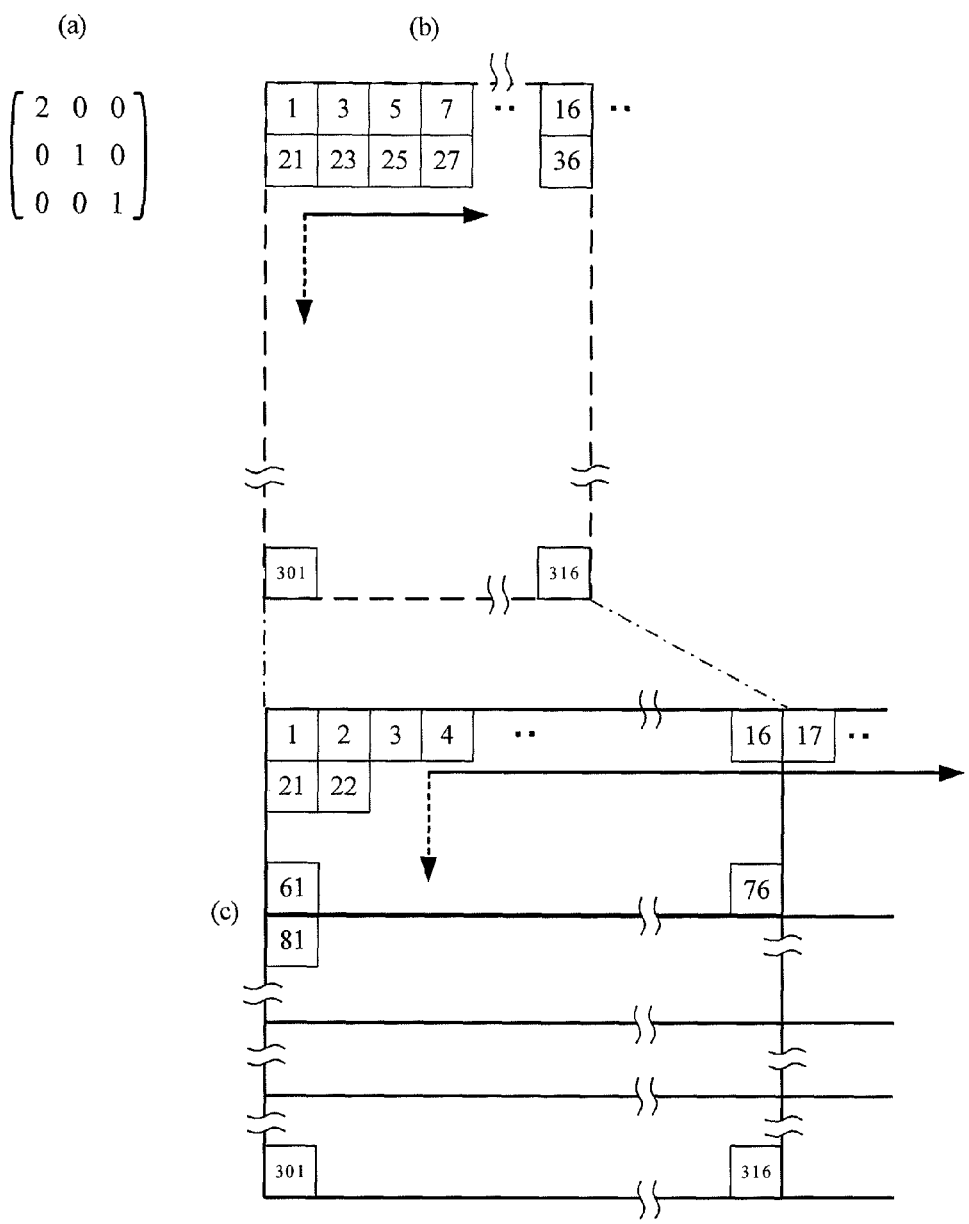
FIG. 4B is a drawing explaining image cache access according to a first preferred embodiment when the rendering block is changed in conjunction with reduction of the reference image.

FIG. 4B shows the case where the magnification ratio in the X direction for coordinate transformation is 2.0. The reference image is displayed reduced by ½ in the horizontal direction. Hence, if the number of horizontal pixels in the rendering block is made half, or 8, it is no longer necessary to use two cache blocks in the X direction. In FIG. 3B, because the number of horizontal pixels in the rendering block is 16, two cache blocks were used in order to render one line of the rendering block. On the other hand, in FIG. 4B, only one cache block is used in order to render one line of the rendering block, the same as in FIG. 4A. As a result, cache efficiency is improved in comparison to FIG. 3B.

Figure 4C:
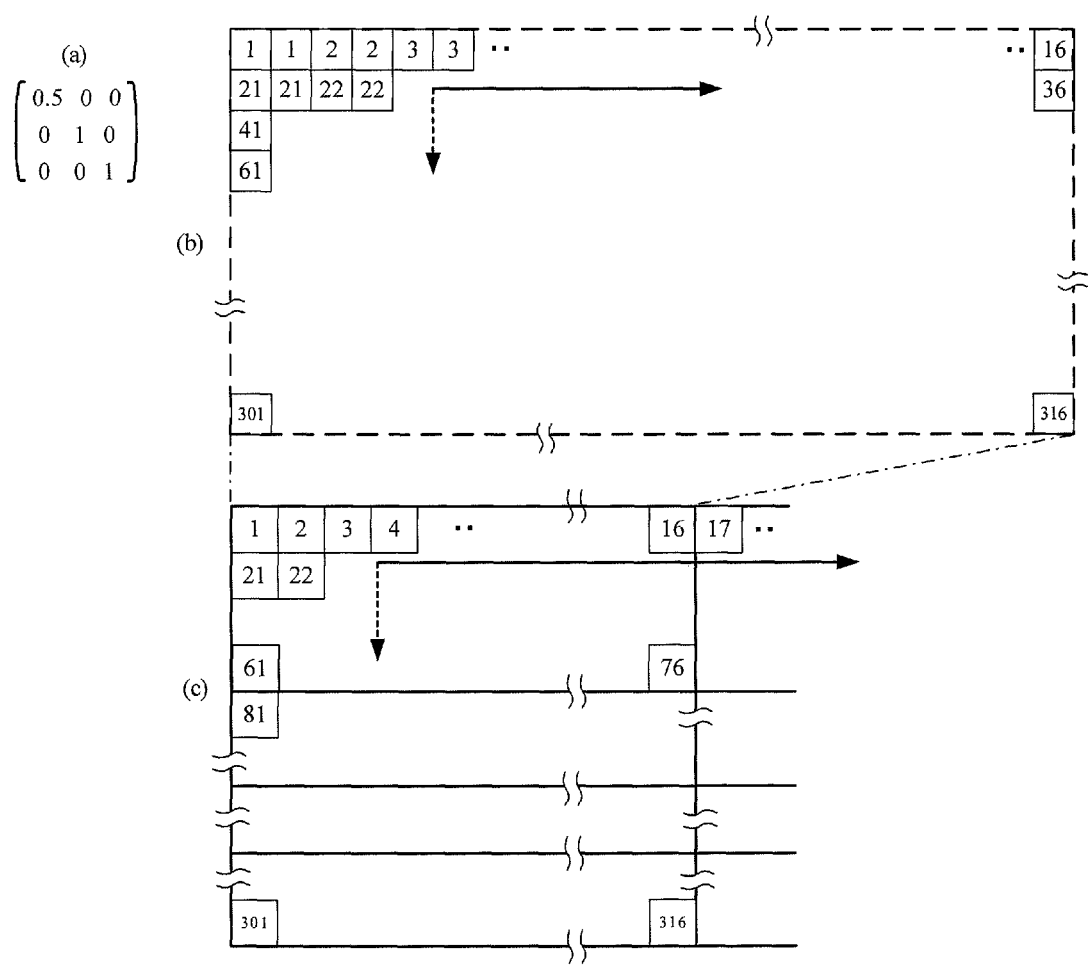
FIG. 4C is a drawing explaining image cache access according to a first preferred embodiment when the rendering block is changed in conjunction with magnification of the reference image.

FIG. 4C shows the case when the magnification ratio in the X direction of the coordinate transformation is 0.5, so the reference image is displayed enlarged to double in the horizontal direction. In the example in FIG. 3C, the number of horizontal pixels in the rendering block was 16, so half of the data in the pixels stored in the cache block is discarded unused. In contrast, with the example in FIG. 4C, the number of horizontal pixels in the rendering block is doubled to 32. Through this, all pixels numbers 1-16 in the cache block are used without being wasted. Hence, memory access to read the same pixel data is not performed again. As a result, memory access volume declines compared to the case in FIG. 3C.

FIG. 4D shows the case where the coordinate transformation is a 90 degree rotation in the clockwise direction. In FIG. 3D, the process was accomplished with the rendering block having 16 vertical pixels and 16 horizontal pixels when doing the rotation process. Consequently, when one row of the rendering block is scanned in the primary scanning direction, four cache blocks are used. In contrast, in FIG. 4D, the region where the rendering block undergoes coordinate transformation is set at four horizontal pixels and 16 vertical pixels to match the cache block. Accordingly, even when one row of pixels in the rendering block is scanned in the primary scanning direction, only one cache block need be used. As a result, cache usage efficiency improves, and memory access volume decline compared to the case shown in FIG. 3D.

As shown above, by making the block size large when the magnification ratio of the coordinate transformation is small and making the block size small when the magnification ratio is large, the image cache 15 is efficiently used, as explained with reference to FIGS. 4A to 4D. In addition, if the numbers of vertical and horizontal pixels in the rendering block are set in conjunction with rotation of the coordinate transformation, the image cache 15 is more efficiently used. Thus, by changing the size of the rendering block in correspondence with the transformation matrix it is possible to improve cache efficiency and reduce memory access volume compared to the cases shown with reference to FIGS. 3A to 3D. As a result, it is possible to accomplish rendering more quickly.

The image rendering device 10 of this preferred embodiment more efficiently uses the image cache 15 by setting the block size large when the magnification ratio of the coordinate transformation is small and setting the block size small when the magnification ratio is large, as explained with reference to FIGS. 4A to 4D.

Next, how best to actually change the rendering block size will be explained. In this first preferred embodiment, a, b, c and d in the coordinate transformation matrix in FIG. 2 are elements indicating magnification/reduction/rotation. The block size is changed in accordance with the magnification ratio expressed by magnification/reduction of the coordinate transformation out of these elements. The number of pixels in the rendering block is made large when the magnification ratio is small and is made small when the magnification ratio is large, in contrast to the cases in FIGS. 3A to 3D. When accomplishing rotation in a coordinate transformation, the number of vertical and horizontal pixels in the rendering block is set such that the region in which the rendering block undergoes coordinate transformation satisfies a below-described prescribed relationship with a rectangular region on the rendering region to which the cache blocks correspond. Setting this so that the prescribed relationship is satisfied includes universally setting the rendering block so that the cache usage efficiency is at least equivalent to or efficiency is greater when accomplishing the same image transformation in comparison to the case of not changing the size of the rendering blocks as shown by example in FIGS. 3A to 3D. The setting may be set statically in advance based on experimentation and/or the like. In addition, settings may also be made dynamically. For example, the size of the rendering block to be set may be found on the basis of a given parameter.

For example, it is possible, for each image transformation matrix, to set the size of the rendering block that should be set. Specifically, when one pixel (unit vector) is scanned in the X-axis direction and the Y-axis direction on the rendering block, it is possible to set the size of the rendering block that should be set on the basis of the magnification ratio, with how many pixels are moved the reference image as the magnification ratio. This example is described below with reference to FIG. 5.

On the other hand, the magnification ratio of the coordinate transformation can be determined from a vector in which a unit vector of the coordinate axes X and Y in the rendering region has undergone coordinate transformation. That is to say, by finding how far the reference coordinates (X',Y') have moved when moving one unit in the X direction and one unit in the Y direction from the output coordinates (X,Y)=(0,0), the magnification ratio is determined. In the coordinate transformation equation in FIG. 2, suppose the reference coordinates (X',Y') when the output coordinates are taken as (X,Y)=(1,0) are a coordinate transformation vector X1, and the coordinates (X',Y') when (X,Y)=(0,1) are a coordinate transformation vector Y1. The magnification ratio of X is indicated by the size of the vector X1 and the magnification ratio of Y is indicated by the size of the vector Y1. When (X,Y)=(1,0) and (X,Y)=(0,1) are respectively substituted into the coordinate transformation equation of FIG. 2, (X1)=(a,c) and Y1=(b,d) are found. From the size of these vectors, the magnification ratio in the X direction is the square root of $a^2+c^2$ and the magnification ratio in the Y direction is the square root of $b^2+d^2$.

Next, the image processing action of the rendering processing device 10, including the rendering block setting action accomplished using the magnification ratio and the image generation action and/or the like will be described using FIGS. 5 and 6.

When an image is requested from the outside, the image rendering device 10 starts a rendering block size setting process. First, the rendering command generator 11 acquires information specifying the reference image and the rendering region (step S10), generates a coordinate transformation matrix and stores such in the register 21 (step S11).

The rendering block setting unit 22 computes the coordinate transformation vectors X1 and Y1 from the coordinate transformation matrix (step S12). The coordinate transformation vectors X1 and Y1 are the unit vectors of the coordinate axes X, Y in the rendering region, the unit vectors being undergone coordinate transformation. Furthermore, the size of the coordinate transformation vector X1 is found.

When finding the size of the vector X1, the squared value is used in order to avoid the process of taking a square root, which increases computation volume, and the number of pixels W in the horizontal direction of the rendering block is found. The next process branches depending on the size of $|X1|^2$ (step S13). FIG. 5 shows an example in which when the number of horizontal pixels W in the cache block is 16, the number of horizontal pixels W in the rendering block can be selected from the four choices of 4, 8, 16 and 32. That is to say, when $|X1|^2$ is smaller than 1, W=32 (step S14) is set. When $|X1|^2$ is at least 1 but smaller than 4, W=16 is set (step S15), when $|X1|^2$ is at least 4 but smaller than 9, W=8 is set (step S16) and when $|X1|^2$ is at least 9, W=4 is set (step S17).

Similarly, the number of pixels in the vertical direction is set. That is to say, the process branches depending on the size of $|Y1|^2$ (step S18). FIG. 5 shows an example in which the number of vertical pixels H in the rendering block can be selected from the four choices of 4, 8, 16 and 32. That is to say, when $|Y1|^2$ is smaller than 1, H=32 is set (step S19), when $|Y1|^2$ is at least 1 but smaller than 4, H=16 is set (step S20), when $|Y1|^2$ is at least 4 but smaller than 9, H=8 is set (step S21) and when $|Y1|^2$ is at least 9, H=4 is set (step S22). The rendering block size setting process then concludes.

How the numbers of vertical and horizontal pixels in the rendering block are set is not limited to the above-described example. The increments of respective pixel numbers may be smaller or greater than in the example shown in FIG. 5. Furthermore, this need not be a discrete setting as in FIG. 5, but may be set continuously in conjunction with the sizes of the coordinate transformation vectors X1 and Y1. In addition, the number of increments in settings of the numbers of vertical and horizontal pixels need not be the same.

Figure 5:
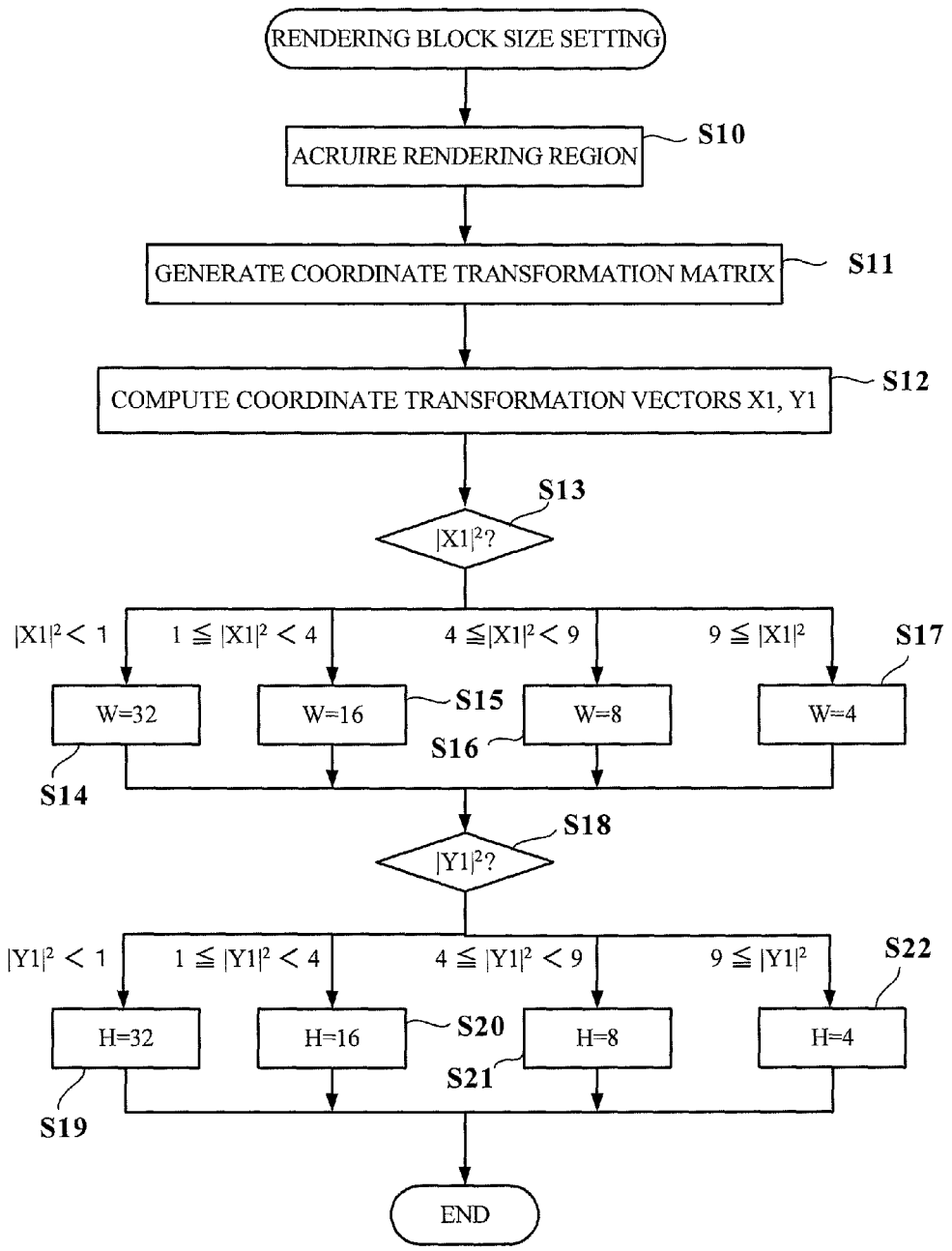
FIG. 5 is a flowchart showing one example of the action of setting the rendering block size according to the first preferred embodiment.

In the above-described process in FIG. 5, the numbers of vertical and horizontal pixels in the rendering block are substituted in accordance with the rotational angle of the coordinate transformation, as explained in FIG. 4D.

Figure 6:
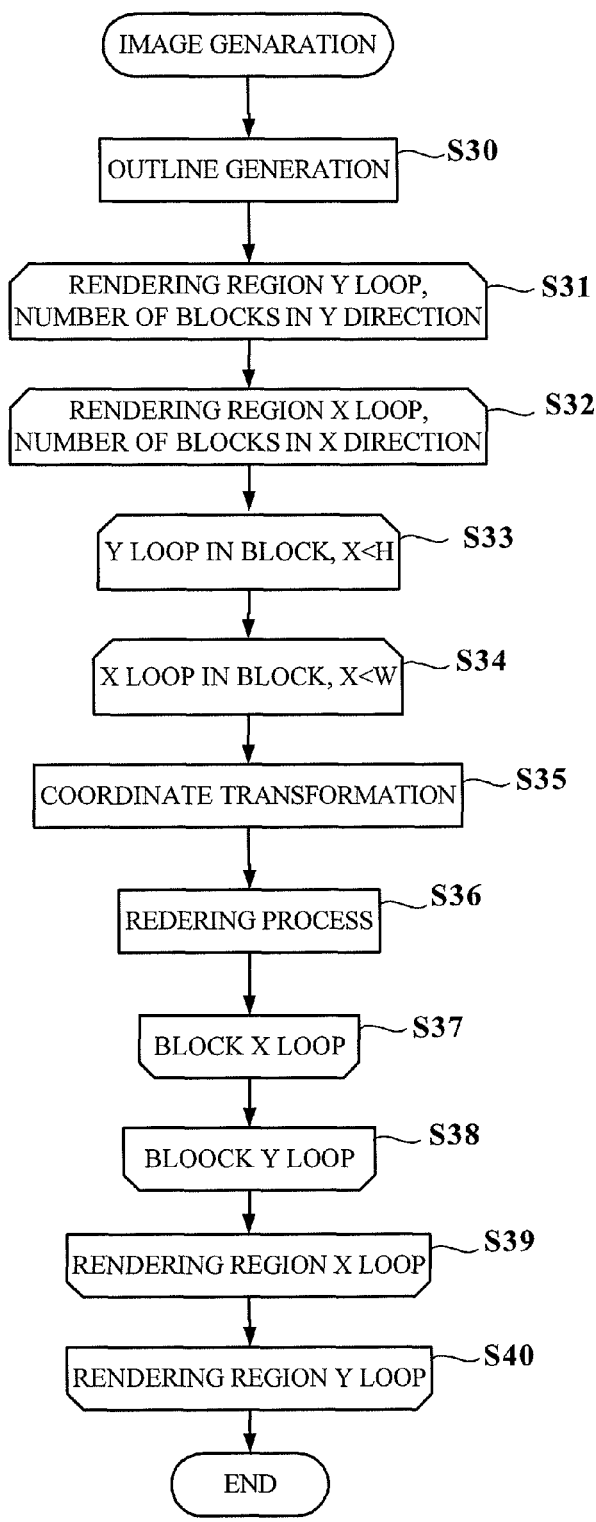
FIG. 6 is a flowchart showing one example of the action of image generation according to the first preferred embodiment.

When the rendering block size setting process concludes, the rendering processing device 10 starts the rendering process shown in FIG. 6. First, the outline generator 12 generates an outline of the reference image (step S30). Next, the pixel generator 13 starts pixel generation.

With the flowchart in FIG. 6, four loops create a nested structure.

First, a rendering block covering the rendering region is set with the rendering block size determined in FIG. 5 (S30). Next, the set rendering block is selected for each row (S31). The inside loop (S32-S39) is executed for the row of the selected block. When the inside loop concludes, the next row is selected and the process continues. This loop process is executed only the same number of times (rendering region Y loop: outermost loop) as the number of blocks in the Y direction (auxiliary scanning direction) (the loop from step S31 to step S40). The process of the rendering region Y loop is such that the rendering block in the primary scanning direction is selected for one row of the rendering block.

Next, a block is selected along the X direction (primary scanning direction) (step S32). The inside loop process (S33 to S38) is further executed for this selected block. When the process in the selected block concludes, the next block is selected and the process continues. This loop process is executed the same number of times (rendering region X loop: inside loop in the block process) as the number of blocks in the X direction (the loop from step S32 to step S39). In some cases the number of rows in the rendering block (number of blocks in the X direction) may differ depending on the shape and inclination of the rendering region.

Next, the process is accomplished on one block selected in S31 and S32 (S33 to S38). In the process of the rendering region X loop, the pixels inside the rendering block are selected for each row (S33), and the loop process (the Y loop inside the block: the outside loop of the process in the block) is accomplished (the loop from step S33 to step S38)) the same number of times as the number of pixels H in the Y direction (the auxiliary scanning direction).

In the Y loop process in the block, the loop process (block X loop: innermost loop) is accomplished (step S34 to step S37) the same number of times as the number of pixels W in the selected row. That is to say, the pixels in the X direction (primary scanning direction) are selected one at a time, and undergo coordinate transformation (step S35) and the rendering process (step S36). These processes are executed for the number of pixels W in one row. When the loops for all of the pixels in the rendering region are finished, pixel generation concludes and rendering ends.

As described above, with the image rendering device 10 according to this first preferred embodiment, the following effects are achieved. The first effect is that by being able to efficiently use the cache, the cache hit ratio improves compared to the cases shown in FIGS. 3A to 3D. The second effect is that because the cache hit ratio improves, the cache update frequency declines and the memory access volume declines. As a result, it is possible to provide an image rendering device capable of high-speed rendering.

(Second Preferred Embodiment)

In the second preferred embodiment, the direction of scanning the rendering region is changed in accordance with the angle of rotation of the coordinate transformation. The composition of the image rendering device 10 of the second preferred embodiment is the same as that in FIG. 1. The second preferred embodiment differs in that the rendering block setting unit 22 sets the direction of scanning of the rendering region in addition to setting the size of the rendering blocks.

Figure 7:
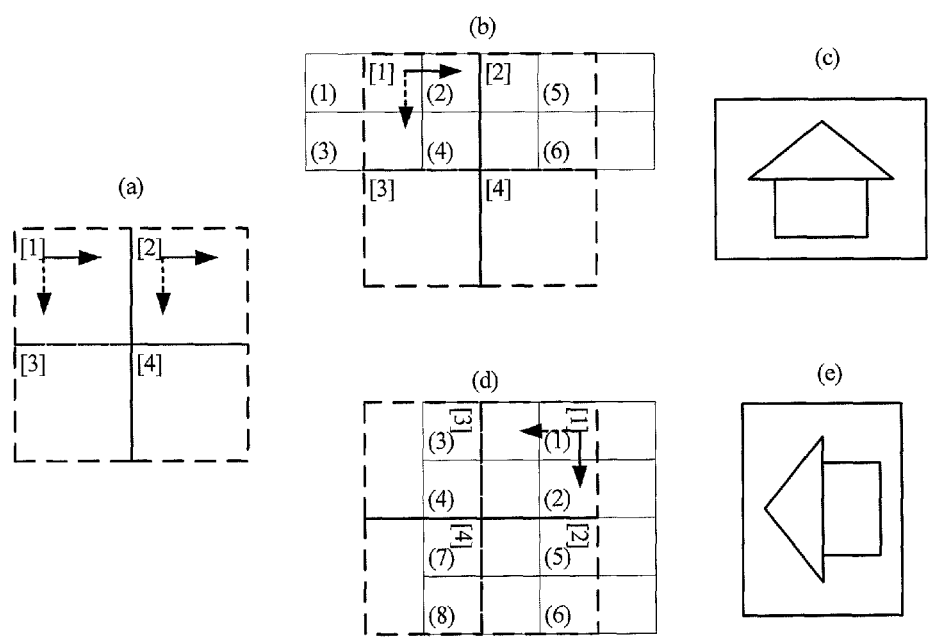
FIG. 7 is a drawing explaining image cache read-out.

How the phenomenon of the cache hit ratio declining due to rotation when the scanning direction is not changed occurs will be explained with reference to FIG. 7. FIG. 7 explains the image cache read-out. The four squares in part (a) of FIG. 7 show rendering blocks. Parts (c) and (d) of FIG. 7 (center example) show the relationship between the image cache 15 and rendering blocks that are the rendering blocks of part (a) having undergone coordinate transformation. The squares with dashed lines indicate the rendering blocks, while the rectangles with thin solid lines indicate the image cache. Parts (c) and (e) of FIG. 7 (right example) indicate the orientations of the images actually rendered in response to the coordinate transformation of parts (b) and (d), respectively. Parts (b) and (c) express the case in which the angle of rotation is 0 degrees. Parts (d) and (e) express the case where the rotation of the coordinate axis is 90 degrees in a clockwise direction. In FIG. 7, the numbers of the rendering blocks are indicated by numerals in brackets. In addition, the numbers of the blocks of the image cache 15 are expressed by the number in parentheses.

In FIG. 7, the size of a rendering block is 16 pixels horizontal and 16 pixels vertical. In addition, the cache block corresponds to a rendering region with 16 horizontal pixels and 8 vertical pixels. The solid arrow in the rendering block indicates the direction of primary scanning in the rendering block. On the other hand, the dotted arrow indicates the auxiliary scanning direction.

Parts (b) and (c) of FIG. 7 are the case in which the magnification ratio is 1 and the angle of rotation is 0 degrees. In this case, when the rendering blocks of numbers [1] and [2] are rendered, data in blocks (1) to (6) of the image cache are referenced. In other words, if a rotation process is accomplished, it is possible to render the reference image by reading data from the external memory 20 to the image cache 15 six times.

However, through the rotation process the necessary data read-out frequency increases. Parts (d) and (e) of FIG. 7 show the case in which the magnification ratio of coordinate transformation is 1 and the angle of rotation is 90 degrees in a clockwise direction. In this case, when the rendering block of number [1] is rendered, the four blocks numbered (1) to (4) in the image cache 15 are read. Similarly, when the rendering block of number [2] is rendered, four blocks are read. As a result, when the rendering blocks of numbers [1] and [2] are rendered, eight readings are necessary. Consequently, rendering speed falls.

Hence, in order to render more quickly, the scanning direction is changed through an angle of rotation. When the angle of rotation (the smaller angle formed by the direction of the horizontal direction of the rendering region after coordinate transformation, and the horizontal direction by the image cache 15; the same hereafter) exceeds 45 degrees, the rendering block setting unit 22 makes the direction orthogonal to the rendering region the primary scanning direction and makes the horizontal direction the auxiliary scanning direction. In this case, the pixel generator 13 selects the rendering blocks covering the rendering region in order by column (auxiliary scanning=horizontal direction), and the pixels inside the selected rendering block are selected by column in the vertical direction (auxiliary scanning=horizontal direction).

Figure 8A:
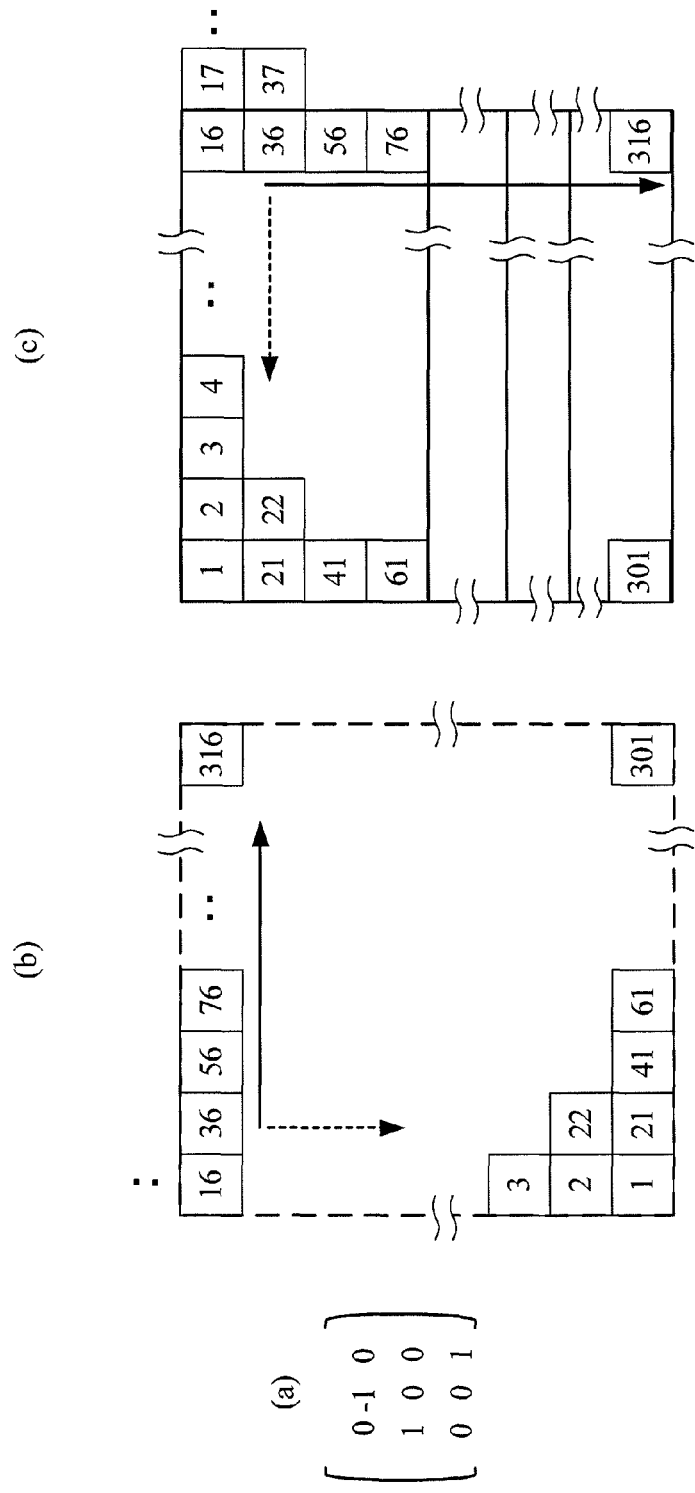
FIG. 8A is a drawing explaining image cache access when the scanning direction is held constant and the reference image is rotated 90 degrees.
Figure 8B:
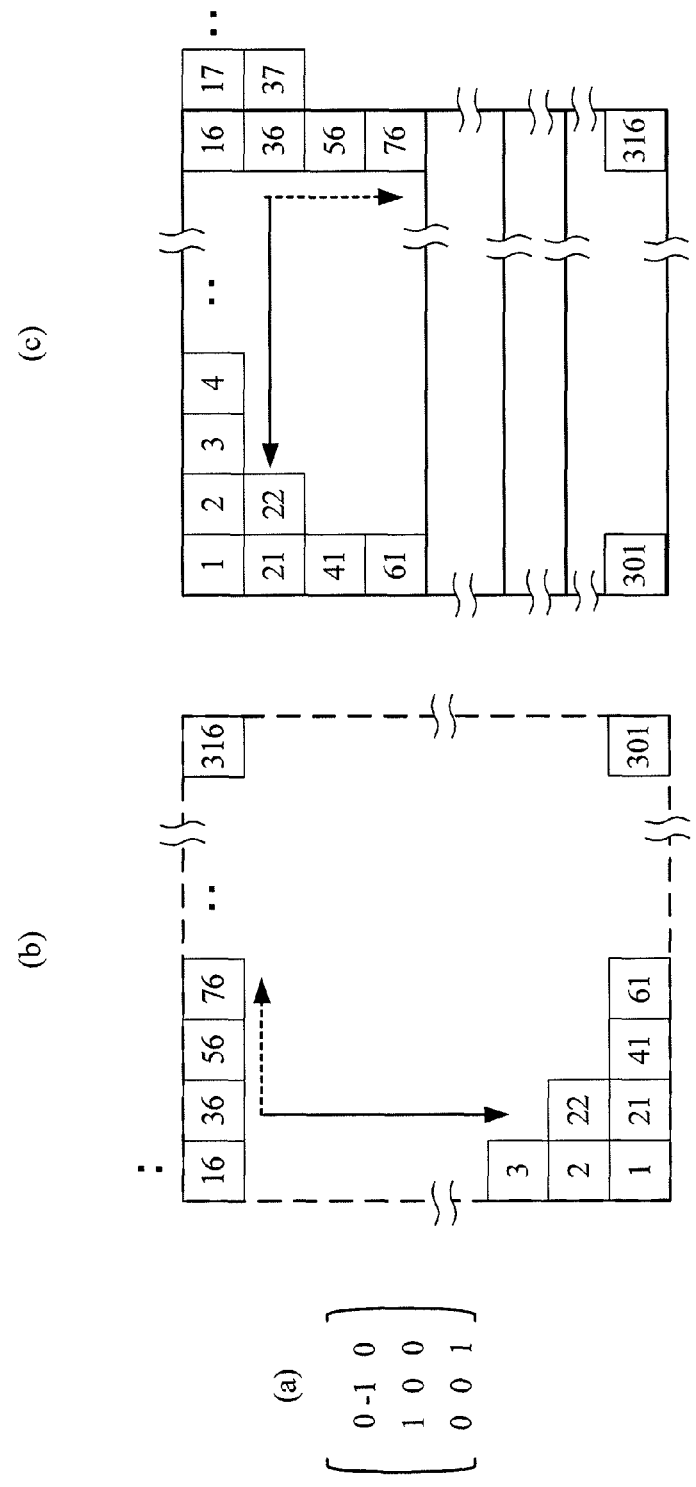
FIG. 8B is a drawing explaining image cache access according to a second preferred embodiment when the scanning direction is changed in conjunction with the 90-degree rotation of the reference image.

FIGS. 8A and 8B are drawings for explaining the relationship between the scanning direction and access to the cache blocks. In FIGS. 8A and 8B, similar to FIGS. 3A to 4D, part (a) shows the coordinate transformation matrix, part (b) shows the rendering block and part (c) shows the composition of the image cache 15. The small squares in parts (b) and (c) of FIGS. 8A and 8B represent pixels. The numerals inside the pixels indicate the correspondence between the pixels of the image cache 15 and the rendering blocks. In addition, the solid arrow indicates the primary scanning direction and the dotted arrow indicates the auxiliary scanning direction. The cache blocks are rectangles 16 pixels wide and 4 pixels tall. The rendering blocks are squares 16 pixels wide and 16 pixels tall.

FIG. 8A explains the image cache access when the scanning direction is fixed and the reference image is caused to rotate 90 degrees in a counterclockwise direction. FIG. 8A is the same as FIG. 3D. When the pixels in the rendering block are scanned in the horizontal direction (the solid arrow in part (b)), the pixels in the image cache 15 are scanned in the vertical direction (the solid arrow in part (c)). The cache block is longer in the horizontal direction. Consequently, when the pixels are scanned in the vertical direction, each time the pixels in one line in the horizontal direction in the rendering block are scanned, four cache blocks are used in the vertical direction.

FIG. 8B explains image cache access when the scanning direction is changed in conjunction with the reference image being rotated 90 degrees. When the angle of rotation of the coordinate transformation is 90 degrees, the vertical direction of the rendering region becomes the primary scanning direction and the horizontal direction becomes the auxiliary scanning direction. When the pixels in the rendering block are scanned in the vertical direction (the solid arrow in part (b)), those in the image cache 15 are scanned in the horizontal direction (the solid arrow in part (c)). Unlike the case in which the primary scanning direction was not changed, scanning of the pixels of the rendering block is contained in the cache block. Consequently, it is not necessary to use two or more cache blocks in the vertical direction, unlike the case in FIG. 8A.

Normally, primary scanning is accomplished in the horizontal direction from left to right when facing the screen, and auxiliary scanning is accomplished in the vertical direction in a direction from top to bottom when facing the screen. However, there are cases in which the direction of primary scanning is from right to left, and in addition when the direction of auxiliary scanning is from bottom to top. When the scanning direction changes, the directions of primary scanning and auxiliary scanning are substituted, as shown in FIG. 8B, with primary scanning moving from top to bottom in the vertical direction when facing the screen and auxiliary scanning moving in the horizontal direction from left to right when facing the screen. The direction of primary scanning in the case of a change may be the direction from bottom to top when facing the screen, as long as this is the vertical direction. In addition, the direction of auxiliary scanning may be a direction from right to left when facing the screen, as long as this is a horizontal direction.

Next, the method of determining the angle of rotation for accomplishing the above-described determination from the coordinate transformation matrix is explained. As explained in the first preferred embodiment, the magnification ratio of coordinate transformation can be found from the size of the coordinate transformation vectors X1 and Y1. Similarly, it is possible to find the angle of rotation from the vectors formed through coordinate transformation of the unit vectors along the coordinate axes X and Y in the rendering region. Using the coordinate transformation equation in FIG. 2, the angle of rotation is found by the angle between the vector (1,0) when the rotation of the coordinate transformation is 0 degrees (a=d=1, b=c=1) and the vector X1 (a,c) after coordinate transformation.

The angle of rotation in general can be found using the inner product of the vectors. However, the computational volume necessary when finding the inner product increases. Hence, a method that does not find the inner product will be substituted. In this second preferred embodiment, all that need be found is whether or not the angle of rotation is 45 degrees or larger. This is because the scanning methods in the X direction and the Y direction that should be determined in this preferred embodiment can be determined through this. Whether or not the angle is at least 45 degrees can be determined by comparing the absolute value |a| of the a in the vector X1 (a,c) with the absolute value |c| of c. If |a|≥|c|, the angle is 45 degrees or less, and if |a|≤|c|, the angle is 45 degrees or greater.

Determining whether the angle of rotation is 45 degrees or less by comparing |a| and |c| will be explained with reference to FIG. 9. The origin, which is the center of the unit circle, is the coordinates (X',Y') of the reference image when (X,Y)= (0,0). When the magnification ratio is 1.0 and there is no magnification or reduction, the vectors X1 and Y1 are vectors oriented on a point on the unit circle in FIG. 10. In other words, the size of X1 and Y1 indicate the magnification ratio. The vector X1=(a,0) when rotation is 0 degrees becomes a point on the X' axis. In other words, θ in FIG. 9, which is the angle between the X' axis and X1, indicates the angle of rotation of the image.

Figure 9:
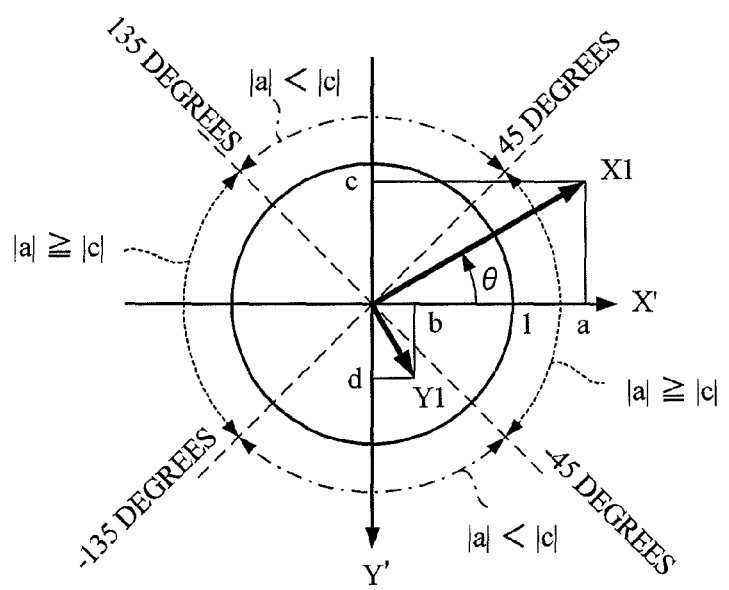
FIG. 9 is a drawing showing the relationship between the angle of rotation and the magnification ratio and coordinate transformation of the coordinate axes in the rendering region, according to the second preferred embodiment.

As shown in FIG. 9, X1 is (a,c). When |a|≥|c| with the angle of rotation in the range −180 degrees to 180 degrees, θ≤−135 degrees, −45 degrees≤θ≤45 degrees or 135 degrees≤θ. On the other hand, when |a|≤|c|, −135 degrees<theta<−45 degrees or 45 degrees<θ<135 degrees. Accordingly, by comparing |a| and |c|, it is possible to determine whether the angle of rotation exceeds or does not exceed 45 degrees. Through this, it is possible to determine the scanning direction with 45 degrees as the boundary. Following the above operation, the horizontal and vertical pixel numbers of the rendering blocks and the scanning direction are set from the coordinate transformation vectors X1 (a,c) and Y1 (b,d).

Figure 10:
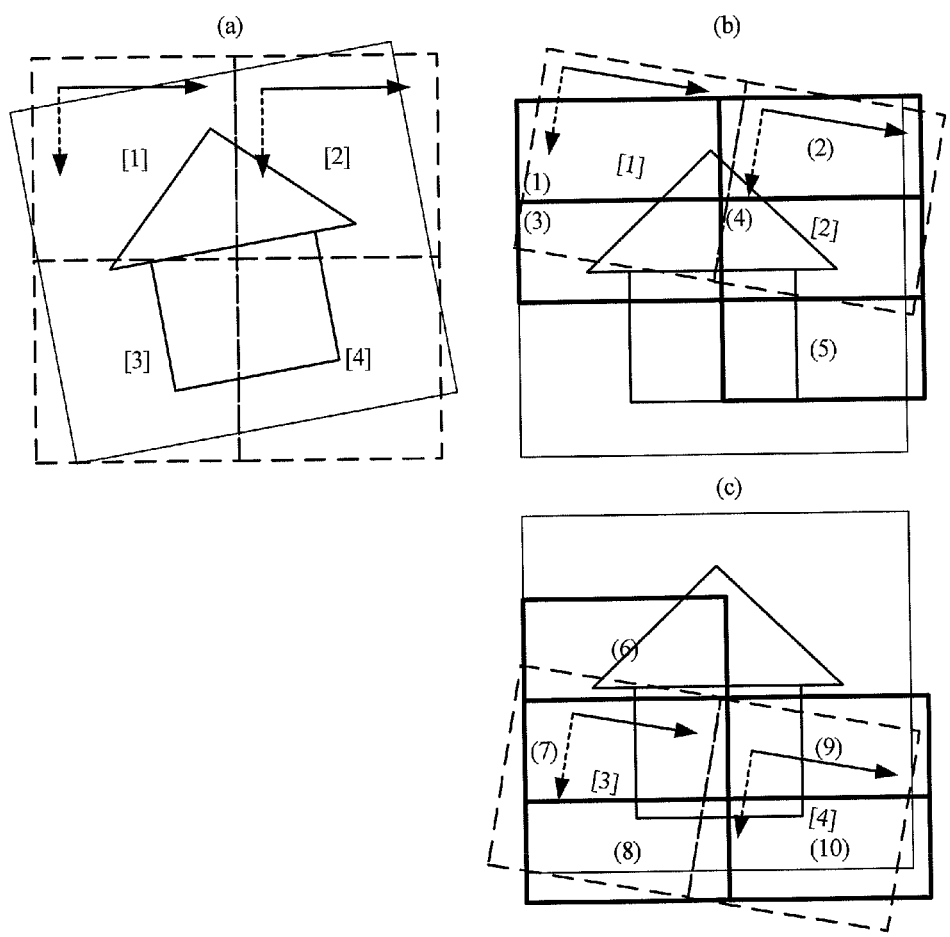
FIG. 10 is a drawing showing the relationship between the image cache and the rendering block when the angle of rotation is small.
Figure 11:
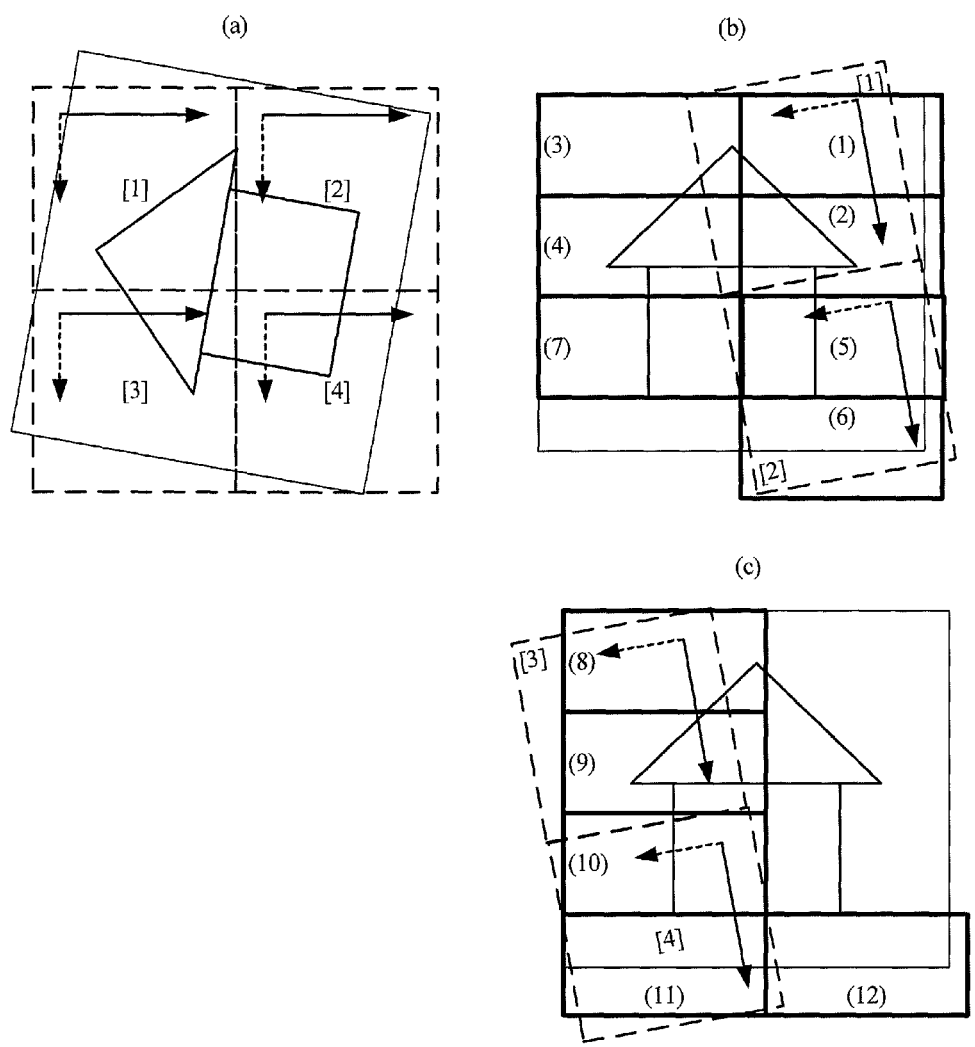
FIG. 11 is a drawing explaining image cache access when the reference image is caused to rotate without changing the scanning direction.
Figure 12:
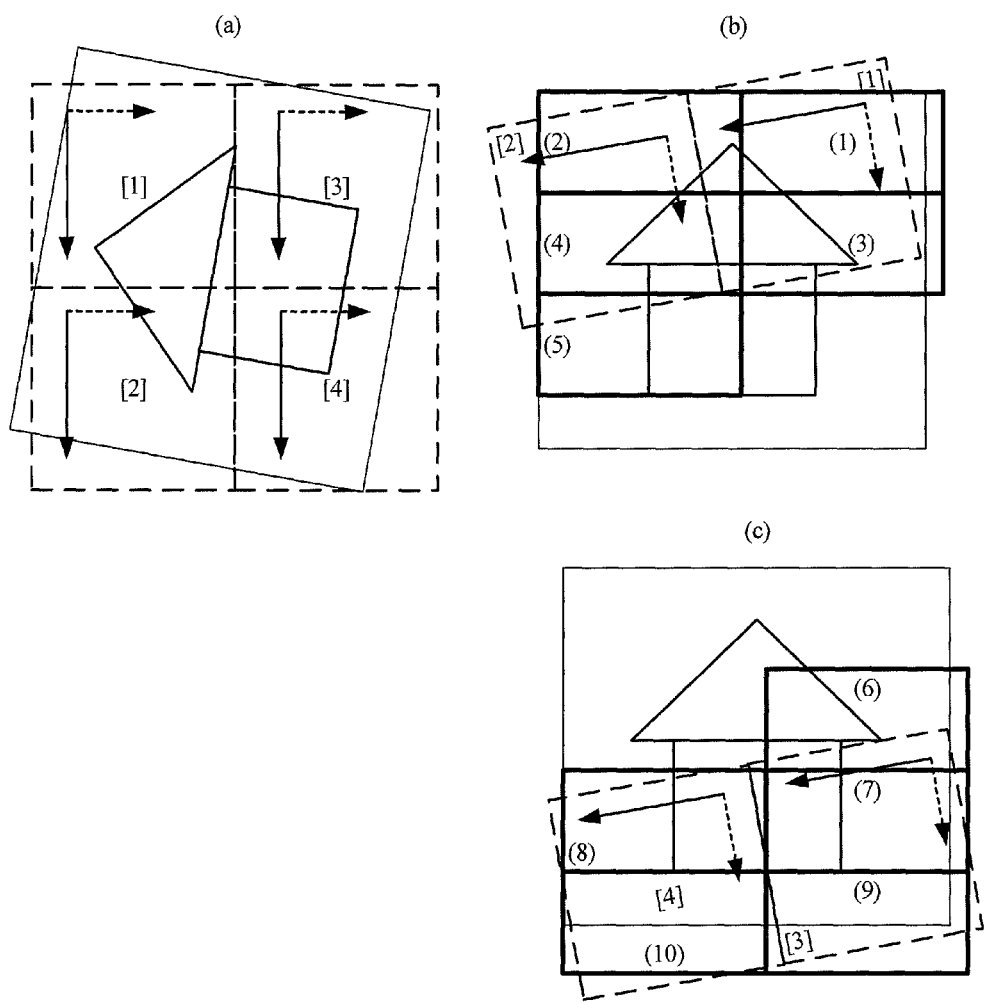
FIG. 12 is a drawing explaining image cache access according to the second preferred embodiment when the scanning direction is changed in conjunction with the angle of rotation of the reference image.

Next, the case where the angle of rotation is not 90 degrees is explained with reference to FIGS. 10 to 12. In FIGS. 10 to 12, part (a) shows the rendering blocks of the rendering region. The solid frame represents the rendering region. The dashed rectangles indicate the rendering blocks. Parts (b) and (c) indicate the relationship between the cache clocks and the rendering blocks of part (a) that have undergone coordinate transformation. The dashes rectangles in parts (b) and (c) indicate rendering blocks that have undergone coordinate transformation. The bold solid rectangles represent cache blocks. The thin solid frames represent the reference image. In FIGS. 10 to 12, the numerals in brackets indicate the numbers of the rendering blocks. In addition, the numerals in parentheses indicate the numbers of the blocks in the image cache 15. The solid arrow represents the direction of primary scanning and the dotted arrow represents the direction of auxiliary scanning.

FIG. 10 shows the relationship between the rendering blocks and the image cache when the angle of rotation is smaller than 45 degrees. FIG. 10 shows as one example a case in which the reference image is rotated 10 degrees in the counterclockwise direction. As shown in part (a) of FIG. 10, the order of scanning the rendering blocks in the rendering region is the order [1]→[4]. The primary scanning direction of the pixels in the rendering block is the horizontal direction of the display image.

As shown in part (b) of FIG. 10, in order to render the rendering blocks of numbers [1] and [2], the cache blocks of (1) to (5) are read in numerical order. Reading of the cache block must be done five times. Similarly, referring to part (c) of FIG. 11, in order to render the rendering blocks of numbers [3] and [4], the cache blocks of (6) to (10) are read in that order. In other words, in order to render the rendering blocks of numbers [1] to [4], it is necessary to read the cache blocks 10 times. The case in which the reference image is rotated 10 degrees in the clockwise direction is the same.

When the reference image is caused to rotate 10 degrees, the hit ratio of the image cache 15 does not change between when the direction of primary scanning of the rendering block is the horizontal direction of the display image and when the direction is the vertical direction. With the image rendering device 10 of this second preferred embodiment, when the angle of rotation is 45 degrees or less, the scanning direction of the rendering region is made the horizontal direction of the display image.

The case when the angle of rotation is greater than 45 degrees will now be explained. As one example, FIGS. 11 and 12 show a case in which the reference image has been rotated 80 degrees counterclockwise.

FIG. 11 explains image cache access when the scanning direction does not change. As shown in part (a) of FIG. 11, the order of scanning the rendering blocks is the order [1]→[4] with primary scanning being horizontal. The primary scanning direction of pixels in the rendering block is the horizontal direction of the display image.

As shown in part (b) of FIG. 11, in order to render the rendering blocks of numbers [1] and [2], the cache blocks are read in order from (1) to (7). Reading the cache blocks seven times is necessary. Similarly, referencing part (c) of FIG. 11, in order to render the rendering blocks of numbers [3] and [4], the cache blocks of (8) to (12) are read in that order.

The cache blocks of (8) to (10) and (12) in part (c) of FIG. 11 are the same as the cache blocks of (3), (4), (7) and (6) in part (b). However, when the maximum number of cache blocks in the image cache 15 is four or less, when rendering of the cache block of number [3] is started, the cache block of (3) (=(8)) has already been discarded. Consequently, it is necessary to read the cache block of (8) again from the external memory. Similarly, when the cache block of (9) becomes necessary, the cache block of (4) has been discarded so it is necessary to read the cache block of (9) again. Furthermore, when the cache block of (12) becomes necessary, the cache block of (6) has been discarded so it is necessary to read the cache block of (12) again.

In the example in FIG. 11, in order to render the rendering blocks of numbers [1] to [4], in total it is necessary to reach the cache blocks 12 times. As a result, the hit ratio of the image cache 15 declines and the memory access volume increases compared to when the angle of rotation is 45 degrees or less (FIG. 11).

FIG. 12 explains the image cache access when the scanning direction is changed in conjunction with the angle of rotation of the reference image. FIG. 12 shows an example of when the reference image is caused to rotate 80 degrees in the counterclockwise direction. As shown in part (a) of FIG. 12, the order of scanning the rendering blocks is with primary scanning in the order of [1]→[4] vertically. The primary scanning direction of the pixels in the rendering blocks is the vertical direction of the display image.

As shown in part (b) of FIG. 12, in order to render the rendering blocks of numbers [1] and [2], the cache blocks of (1) to (5) are read in numerical order. The cache blocks must be read five times. Similarly, with reference to part (c) of FIG. 12, in order to render the rendering blocks of numbers [3] and [4], the cache blocks are reading in order from (6) to (10).

The cache blocks of (6) and (8) in part (c) of FIG. 12 are the same as the cache blocks of (3) and (5) in part (b). When the maximum number of cache blocks in the image cache 15 is four, when starting to render the rendering block of number [3], there is a possibility that the cache block of (3) still remains in the image cache 15. Consequently, depending on the case it is not necessary to again reach the cache block (6). Similarly, when the cache block of (8) becomes necessary, there is a possibility that the cache block of (5) still remains, so depending on the case it is not necessary to read again.

In the example in FIG. 12, in order to render the rendering blocks of numbers [1] to [4], in total it is necessary to read the cache blocks 10 times. When the maximum number of cache blocks in the image cache 15 is four or more, the reading frequency declines further. As a result, the hit ratio of the image cache 15 improves compared to the case in FIG. 11. Even the case when the reference image is rotated 80 degrees in the clockwise direction is the same as the case when the rotation is counterclockwise.

Figure 13:
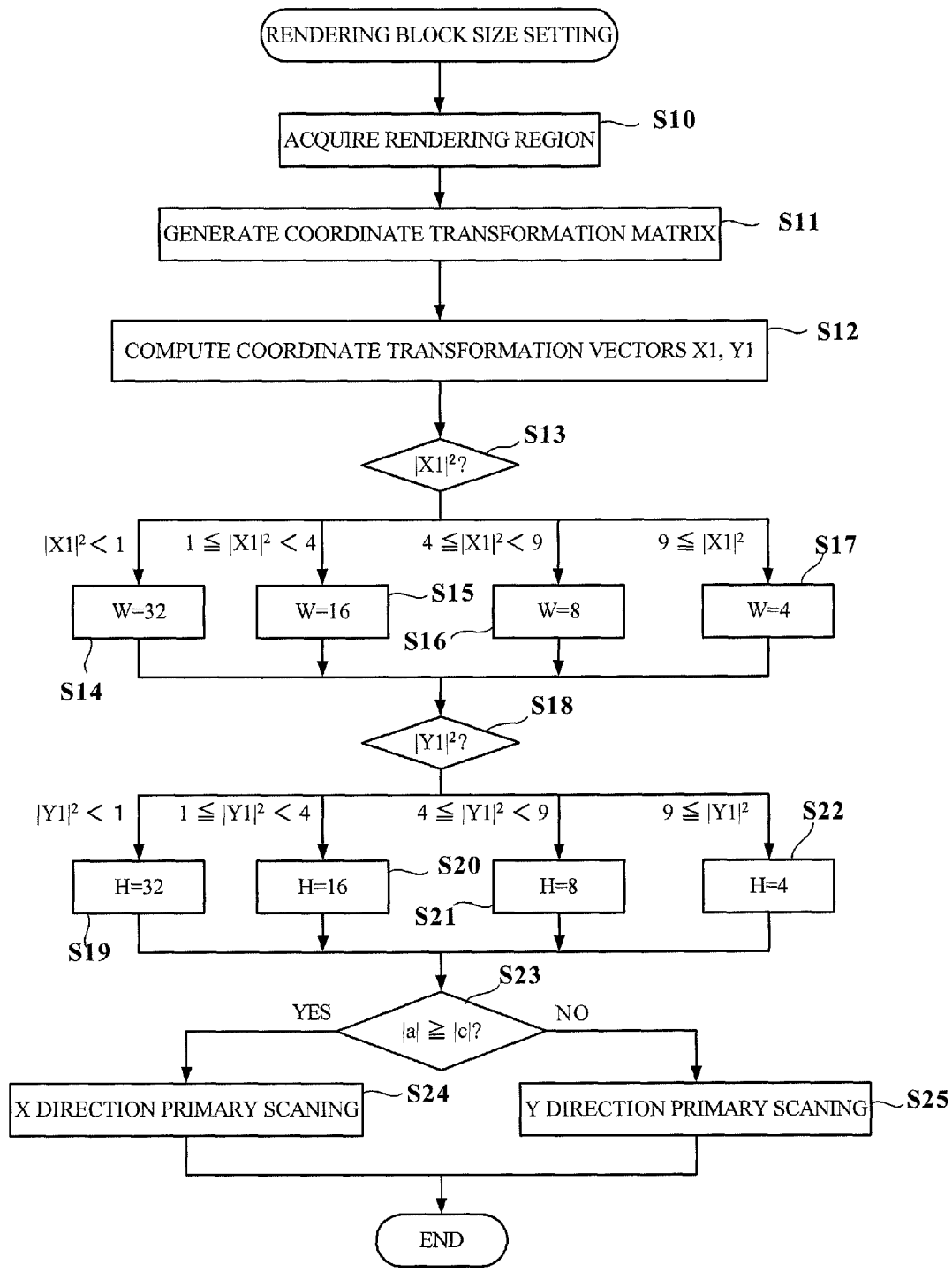
FIG. 13 is a flowchart showing one example of the action of setting image block size according to the second preferred embodiment.

Next, the process of setting the rendering block size in the second preferred embodiment will be described with reference to FIG. 13. In the second preferred embodiment, after setting the numbers of vertical and horizontal pixels in the rendering blocks, the primary scanning direction of the rendering region is set in accordance with the angle of rotation of coordinate transformation. In the flowchart in FIG. 13, the actions from step S10 to step S22 are the same as the actions from step S10 to step S22 in FIG. 5.

After setting the vertical and horizontal pixel numbers for the rendering blocks, a determination is made as to whether or not the a and c of the vector X1 (a,c) are such that $|a| \geq |c|$ (step S23). If $|a| \geq |c|$ (step S23: Yes), the horizontal direction of the rendering region (the X direction) becomes the primary scanning direction (step S24). If $|a| \geq |c|$ (step S23: No), the vertical direction of the rendering region (Y direction) becomes the primary scanning direction. Then the rendering block size setting process ends.

Figure 14:
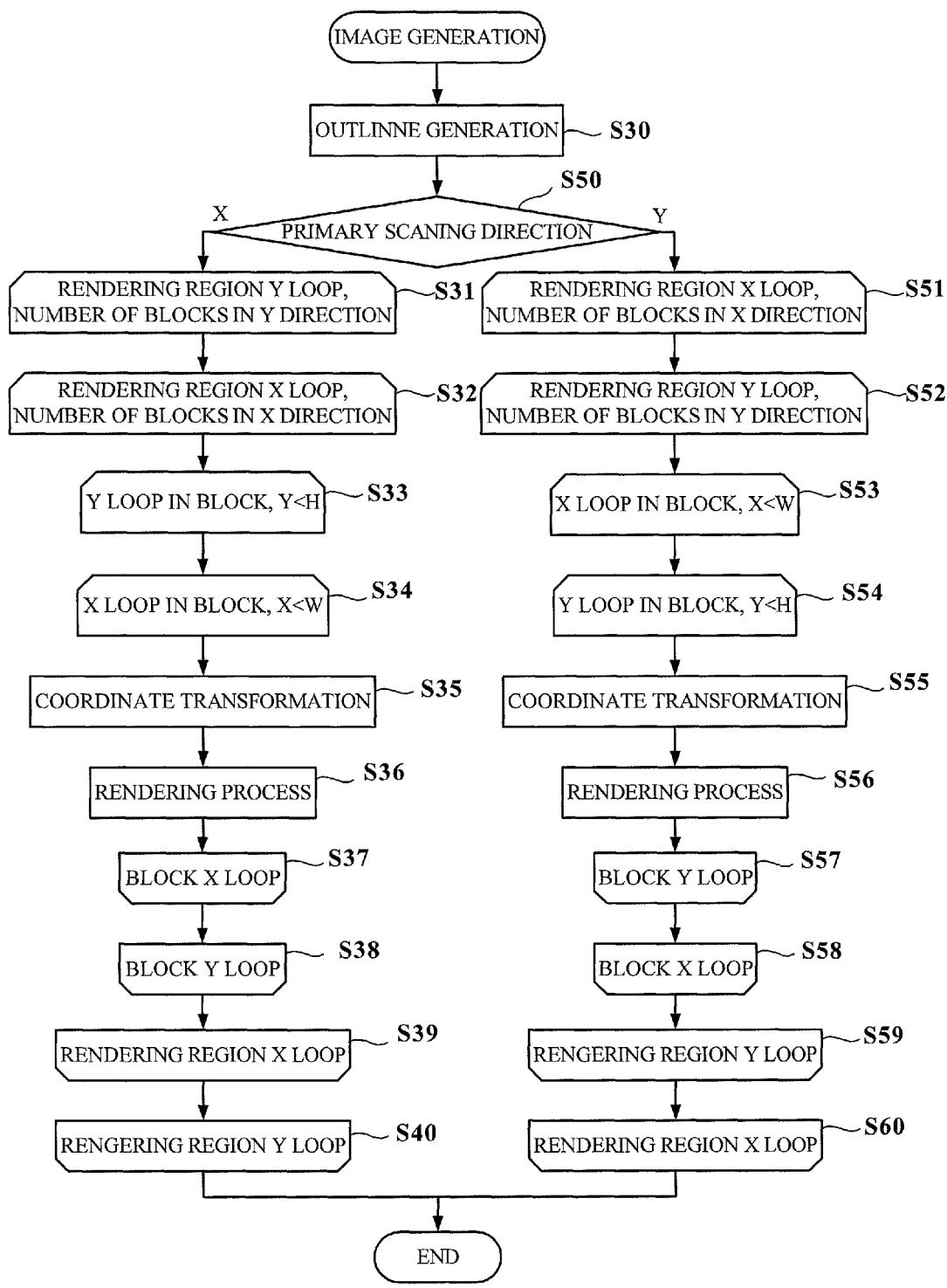
FIG. 14 is a flowchart showing one example of the action of image generation according to the second preferred embodiment.

Next, the process of image generation in the second preferred embodiment will be explained with reference to FIG. 14. When setting of the rendering block size ends, the rendering process begins. The outline generator 12 generates an outline (step S30). Next, the rendering block setting unit 22 determines whether the set primary scanning direction is the X direction or the Y direction (step S50). If the primary scanning direction is the X direction (step S50: X), a loop is executed in the rendering region starting from the Y direction (steps S31 to S40). That is to say, the same process is accomplished as in steps S31 to S40 of FIG. 6.

If the primary scanning direction is the Y direction (step S50: Y), a loop is executed in the rendering region starting from the X direction (steps S51 to S60). That is to say, the same processes as in steps S31 to S40 of FIG. 6 is accomplished after switching the X direction and the Y direction in the process of steps S31 to S40. In the process in steps S51 to S60, four loops create a nested structure.

A rendering block that partitions and covers the rendering region is set. Following this, the rendering blocks are selected by column. The inside loop is executed on the columns of selected blocks. When the inside loop ends, the next column is selected. This loop process is accomplished the same number of times (rendering region X loop: outermost loop) as the number of blocks in the X direction (auxiliary scanning direction) (the loop of steps S51 to S60).

In the process of the rendering region X loop, rendering blocks are selected in the primary scanning (Y) direction for one column of rendering blocks. The inside loop process is further executed on the selected block. When the process on the selected block ends, the next block is selected. This loop process is accomplished the same number of times (rendering region Y loop: innermost loop in the block process) as the number of blocks in the Y direction (primary scanning direction) (the loop of steps S52 to S59). It is possible that the number per column of the rendering blocks (the number of blocks in the Y direction) could vary depending on the shape and orientation of the rendering region.

In the process of the rendering region Y loop, the process is accomplished on one pixel at a time in the one selected block. First, the pixels in the rendering block are selected by column. Furthermore, the inside loop is executed on the selected column, and when this ends the next column is selected. The loop process (X loop in the block: outside loop in the block process) is accomplished for the number of pixels W in the X direction (auxiliary scanning direction) (the loop of steps S53 to S58).

In the process of the X loop in the block, the loop process (the block Y loop: the innermost loop) is accomplished for the selected column of pixels (steps S54 to S57). That is to say, pixels are selected one by one in the Y direction (primary scanning direction), and coordinate transformation (step S55) and the rendering process (step S56) are accomplished. These processes are accomplished for the number of pixels H in one column. When the loops for all of the pixels in the rendering region have ended, pixel generation concludes and rendering stops.

As explained above, the image rendering device 10 of this second preferred embodiment can more efficiently use the image cache than the case in which the scanning direction is not changed when the reference image is rotated and displayed. As a result, the cache updating frequency and memory access volume decline from the case in FIG. 11.

Figure 15:
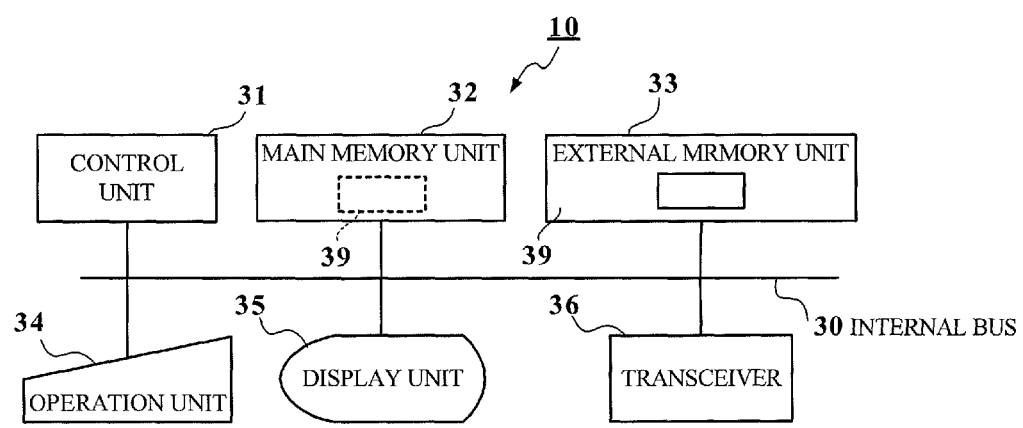
FIG. 15 is a block diagram showing an example of the hardware composition of an image rendering device according to the preferred embodiments of the present invention.

FIG. 15 is a block diagram showing an example of the hardware composition of the image rendering device 10 according to the preferred embodiments of the present invention. The image rendering device 10 has a control unit 31, a main memory unit 32, an external memory unit 33, and operation unit 34, a display unit 35 and a transceiver 36. The main memory unit 32, the external memory unit 33, the operation unit 34, the display unit 35 and the transceiver 36 are all connected to the control unit 31 via an internal bus 30.

The control unit 31 is composed of a CPU (Central Processing Unit) and/or the like. The control unit 31 executes the processes of the image rendering device 10 following a control program 39 stored in the external memory unit 33.

The main memory unit 32 is composed of RAM (Random-Access Memory) and/or the like. The main memory unit 32 loads the control program 39 stored in the external memory 33 and is used as a work space for the control unit 31.

The external memory unit 33 is composed of nonvolatile memory such as flash memory, a hard disk, a DVD-RAM (Digital Versatile Disc Random-Access Memory), a DVD-RW (Digital Versatile Disc ReWritable) and/or the like. The external memory unit 33 stores in advance the control program 39 for causing the control unit 31 is execute the above-described processes. In addition, the external memory unit 33 supplies data storing the control program 39 to the control unit 31 following instructions from the control unit 31 and stores data supplied from the control unit 31. The external memory 20 in FIG. 1 is included in the external memory 33.

The operation unit 34 is composed of a keyboard, a pointing device such as a mouse, and an interface device for connecting the keyboard and the pointing device and/or the like to the internal bus 30. The rendering processing device 10 receives input such as image displays, reference image designation and rendering region and coordinate transformation information via the operation unit 34.

The display unit 35 is composed of a CRT (Cathode Ray Tube) or an LCD (Liquid Crystal Display) and/or the like. The display unit 35 displays display images generated by the rendering processor 16.

The transceiver 36 is composed of a communication device and a serial interface or LAN (Local Area Network) interface for connecting thereto. The transceiver 37 receives content including images to be displayed from a server (unrepresented) via a network (unrepresented).

The control program 39 in FIG. 15 accomplishes the processes related to the rendering command generator 11, the outline generator 12, the pixel generator 13, the coordinate transformation unit 14, the image cache 15, the rendering processor 16, the display unit 17, the external memory 20, the register 21 and the rendering block setting unit 22 using the control unit 31, the main memory unit 32, the external memory unit 33, the operation unit 34, the display unit 35 and the transceiver 36.

Ideal variations of the present invention are included in the following compositions.

In the image rendering device according to a first aspect of the present invention, preferably the setting unit sets the number of vertical and horizontal pixels in the rectangular region so that at least the first region is contained within the scope of the second region in conjunction with the number of blocks and the block size of the image cache.

Preferably, the setting unit sets the number of vertical and horizontal pixels in this rectangular region so that the rectangular region becomes smaller if the magnification of the coordinate transformation becomes larger, and so that the rectangular region becomes larger if this magnification becomes smaller.

Preferably, the transformation unit switches the direction of primary scanning and the direction of auxiliary scanning of the scanning directions, selects rectangular regions covering the rendering region in order and scans and selects pixels from inside the selected rectangular regions, when the smaller angle made by the direction of the horizontal direction of the rendering region that has undergone coordinate transformation and the horizontal direction of the second region exceeds 45 degrees.

In the image rendering method according to a third aspect of the present invention, preferably the numbers of vertical and horizontal pixels in the rectangular region are set so that at least the first region is contained within the scope of the second region in conjunction with the number of blocks and block size of the image cache.

Preferably, the settings are such that the numbers of vertical and horizontal pixels in the rectangular region are set so that the rectangular region becomes smaller if the magnification of the coordinate transformation becomes larger, and so that the rectangular region becomes larger if this magnification becomes smaller.

Preferably, the computation is such that the direction of primary scanning and the direction of auxiliary scanning of the scanning directions are switched, rectangular regions covering the rendering region are selected in order, and pixels are selected by scanning the selected rectangular regions, when the smaller angle made by the direction of the horizontal direction of the rendering region after coordinate transformation and the horizontal direction of the second region exceeds 45 degrees.

In addition, the above-described hardware composition and flowcharts are one example, and arbitrary alterations and revision are possible.

The portion that is the core of accomplishing an image rendering process comprising the control unit 31, the main memory unit 32, the external memory unit 33, the operation unit 34 and the internal bus 30 can be realized using a regular computer system and not a specialized system. For example, an image rendering device for executing the above-described processes may be comprised by storing and distributing a computer program for executing the above-described actions on a computer-readable recording medium (flexible disk, CD-ROM, DVD-ROM and/or the like) and installing this computer program on a computer. In addition, this computer program may be stored in a storage device possessed by a server device on a communications network such as the Internet, and the image rendering device may be comprised by a regular computer system downloading such.

In addition, when the functions of the image rendering device are shared by an OS (operating system) and application programs, or are realized by cooperation between an OS and application programs, the application program portion alone may be stored on a recording medium or storage device.

It is also possible to overlay a computer program on carrier waves and distribute such via a communications network. For example, the computer program may be posted on a bulletin board system (BBS) on a communications network and the computer program may be distributed via the network. Furthermore, it would be fine to enable execution of the above-described processes by activating this computer program and similarly executing other application programs under the control of the OS.

The present application claims the benefit of Japanese Patent Application No. 2009-262099, submitted 17 Nov. 2009, the entire disclosure of which is incorporated by reference herein.

EXPLANATION OF SYMBOLS 10 image rendering device
11 rendering command generator
12 outline generator
13 pixel generator
14 coordinate transformation unit
15 image cache
16 rendering processor
17 display unit
20 external memory
21 register
22 rendering block setting unit
31 control unit
32 main memory unit
33 external memory unit
34 operation unit
35 display unit
36 transceiver
39 control program

The invention claimed is:

1. An image rendering device, comprising one or more hardware processor to implement:
a rendering region acquisition unit for acquiring information for specifying a rendering region, which is a region in which a reference image is converted and displayed, in a display image;
a coordinate transformation information acquisition unit for acquiring information designating coordinate transformation from coordinates of the rendering region to coordinates of the reference image, for converting and displaying the reference image in the rendering region;
a setting unit for setting vertical and horizontal pixel numbers in a rectangular region covering the rendering region such that a prescribed relationship is satisfied by a first region obtained by having the rectangular region undergo the coordinate transformation, and a second region positioned on the reference image and in response to image data recorded in an image cache that stores the reference image;
a generation unit for generating one or more of the rectangular regions covering the rendering region with the vertical and horizontal pixel numbers set by the setting unit;
a transformation unit for selecting the rectangular regions in order in a prescribed scanning direction, and computing pixel position within the reference image through the coordinate transformation from pixels selected in order in the scanning direction in the selected rectangular regions;
an image acquisition unit for reading image data in the pixel position computed by the transformation unit from memory storing the reference image;
the image cache for storing image data read from the memory; and
a rendering unit for reading image data from the image cache and converting such into pixels in the rendering region;
wherein the setting unit sets the vertical and horizontal pixel numbers in the rectangular region so that the rectangular region is small if the coordinate transformation magnification is large, and so that the rectangular region is large if said magnification is small.

2. The image rendering device of claim 1, wherein the setting unit sets the vertical and horizontal pixel numbers of the rectangular region in conjunction with block size and block numbers of the image cache so that at least the first region is contained within the second region.

3. The image rendering device of claim 1, wherein when a smaller angle formed by the direction of the horizontal direction of the rendering region after coordinate transformation and the horizontal direction of the second region exceeds 45 degrees, the transformation unit switches a primary scanning direction and an auxiliary scanning direction of the primary scanning direction, selects in order rectangular regions covering the rendering region, and scans the selected rectangular region to select pixels.

4. The image rendering device of claims 2,
wherein when a smaller angle formed by the direction of the horizontal direction of the rendering region after coordinate transformation and the horizontal direction of the second region exceeds 45 degrees, the transformation unit switches a primary scanning direction and an auxiliary scanning direction of the primary scanning direction, selects in order rectangular regions covering the rendering region, and scans the selected rectangular region to select pixels.

5. An image rendering device, comprising one or more hardware processor to implement:
a rendering region acquisition unit for acquiring information for specifying a rendering region, which is a region in which a reference image is converted and displayed, in a display image;
a coordinate transformation information acquisition unit for acquiring information designating coordinate transformation from coordinates of the rendering region to coordinates of the reference image, for converting and displaying the reference image in the rendering region;
a setting unit for rectangular regions covering the rendering region;
a generation unit for generating one or more of the rectangular regions covering the rendering region with the rectangular regions set by the setting unit;
a transformation unit for selecting the rectangular regions in order in a prescribed scanning direction, and computing pixel position within the reference image through the coordinate transformation from pixels selected in order in the scanning direction in the selected rectangular regions;
an image acquisition unit for reading image data in the pixel position computed by the transformation unit from memory storing the reference image;
the image cache for storing image data read from the memory; and
a rendering unit for reading image data from the image cache and converting such into pixels in the rendering region;
wherein when a smaller angle formed by the direction of the horizontal direction of the rendering region after coordinate transformation and the horizontal direction of a region corresponding to image data recorded in an image cache in which the reference image is stored and positioned on the reference image exceeds 45 degrees, the transformation unit switches a primary scanning direction and an auxiliary scanning direction of the primary scanning direction, selects in order rectangular regions covering the rendering region, and scans the selected rectangular region to select pixels.

6. An image rendering method for:

acquiring information for specifying a rendering region, which is a region in which a reference image is converted and displayed, in a display image;

acquiring information designating coordinate transformation from coordinates of the rendering region to coordinates of the reference image, for converting and displaying the reference image in the rendering region;

setting the size of rectangular regions such that a prescribed relationship is satisfied by a first region obtained by having the rectangular regions undergo the coordinate transformation, and a second region positioned on the reference image and in response to image data recorded in an image cache that stores the reference image;

generating one or more rectangular regions covering the rendering region with the vertical and horizontal pixel numbers set by the set size;

selecting the rectangular regions in order in a prescribed scanning direction, and computing pixel position within the reference image through the coordinate transformation from pixels selected in order in the scanning direction in the selected rectangular regions;

reading image data in the computed pixel position from memory storing the reference image;

storing image data read from the memory; and reading image data from the image cache and converting such into pixels in the rendering region;

wherein the setting step sets the vertical and horizontal pixel numbers in the rectangular region so that the rectangular region is small if the coordinate transformation magnification is large, and so that the rectangular region is large if said magnification is small.

7. The image rendering method of claim 6, wherein the setting step sets the vertical and horizontal pixel numbers of the rectangular region in conjunction with block size and block numbers of the image cache so that at least the first region is contained within the second region.

8. The image rendering method of claim 6, wherein when a smaller angle formed by the direction of the horizontal direction of the rendering region after coordinate transformation and the horizontal direction of the second region exceeds 45 degrees, the transformation switches a primary scanning direction and an auxiliary scanning direction of the primary scanning direction, selects in order rectangular regions covering the rendering region, and scans the selected rectangular region to select pixels.

9. The image rendering method of claim 7, wherein when a smaller angle formed by the direction of the horizontal direction of the rendering region after coordinate transformation and the horizontal direction of the second region exceeds 45 degrees, the transformation switches a primary scanning direction and an auxiliary scanning direction of the primary scanning direction, selects in order rectangular regions covering the rendering region, and scans the selected rectangular region to select pixels.

10. An image rendering method for:

acquiring information for specifying a rendering region, which is a region in which a reference image is converted and displayed, in a display image;

acquiring information designating coordinate transformation from coordinates of the rendering region to coordinates of the reference image, for converting and displaying the reference image in the rendering region;

setting rectangular regions for covering the rendering region;

generating one or more of the rectangular regions covering the rendering region with the set rectangular regions;

selecting the rectangular regions in order in a prescribed scanning direction, and computing pixel position within the reference image through the coordinate transformation from pixels selected in order in the scanning direction in the selected rectangular regions;

reading image data in the pixel position computed by the coordinate transformation from memory storing the reference image;

storing image data read from the memory;

reading image data from the image cache and converting such into pixels in the rendering region; and when a smaller angle formed by the direction of the horizontal direction of the rendering region after coordinate transformation and the horizontal direction of a region corresponding to image data recorded in an image cache in which the reference image is stored and positioned on the reference image exceeds 45 degrees, the transformation switches a primary scanning direction and an auxiliary scanning direction of the primary scanning direction, selects in order rectangular regions covering the rendering region, and scans the selected rectangular region to select pixels.

11. A non-transitory computer-readable recording medium on which is recorded a program that causes a computer to execute:

a process for acquiring information for specifying a rendering region, which is a region in which a reference image is converted and displayed, in a display image;

a process for acquiring information designating coordinate transformation from coordinates of the rendering region to coordinates of the reference image, for converting and displaying the reference image in the rendering region;

a process for setting the size of rectangular regions such that a prescribed relationship is satisfied by a first region obtained by having the rectangular regions undergo the coordinate transformation, and a second region positioned on the reference image and in response to image data recorded in an image cache that stores the reference image;

a process for generating one or more of the rectangular regions covering the rendering region with the set size;

a process for selecting the rectangular regions in order in a prescribed scanning direction, and computing pixel position within the reference image through the coordinate transformation from pixels selected in order in the scanning direction in the selected rectangular regions;

a process for reading image data in the computed pixel position from memory storing the reference image;

a process for storing image data read from the memory; and a process for reading image data from the image cache and converting such into pixels in the rendering region;

wherein the setting step sets the vertical and horizontal pixel numbers in the rectangular region so that the rectangular region is small if the coordinate transformation magnification is large, and so that the rectangular region is large if said magnification is small.

12. A non-transitory computer-readable recording medium on which is recorded a program that causes a computer to execute:

a process for acquiring information for specifying a rendering region, which is a region in which a reference image is converted and displayed, in a display image;

a process for acquiring information designating coordinate transformation from coordinates of the rendering region to coordinates of the reference image, for converting and displaying the reference image in the rendering region;

a process for setting rectangular regions for covering the rendering region;

a process for generating one or more of the rectangular regions covering the rendering region with the set rectangular regions;

a process for selecting the rectangular regions in order in a prescribed scanning direction, and computing pixel position within the reference image through the coordinate transformation from pixels selected in order in the scanning direction in the selected rectangular regions;

a process for reading image data in the pixel position computed by the coordinate transformation from memory storing the reference image;

a process for storing image data read from the memory;

a process for reading image data from the image cache and converting such into pixels in the rendering region; and a process for, when a smaller angle formed by the direction of the horizontal direction of the rendering region after coordinate transformation and the horizontal direction of a region corresponding to image data recorded in an image cache in which the reference image is stored and positioned on the reference image exceeds 45 degrees, the transformation switches a primary scanning direction and an auxiliary scanning direction of the primary scanning direction, selects in order rectangular regions covering the rendering region, and scans the selected rectangular region to select pixels.

* * * * *